United States Patent
Yamada

(10) Patent No.: US 9,611,124 B2
(45) Date of Patent: Apr. 4, 2017

(54) OPTICAL FIBER SCREENING TEST METHOD AND OPTICAL FIBER SCREENING TEST APPARATUS

(71) Applicant: FUJIKURA, LTD., Koto-ku, Tokyo (JP)

(72) Inventor: Naritoshi Yamada, Sakura (JP)

(73) Assignee: FUJIKURA, LTD., Koto-Ku, Tokyo (JP)

(*) Notice: Subject to any disclaimer, the term of this patent is extended or adjusted under 35 U.S.C. 154(b) by 519 days.

(21) Appl. No.: 14/199,641

(22) Filed: Mar. 6, 2014

(65) Prior Publication Data

US 2014/0252154 A1 Sep. 11, 2014

(30) Foreign Application Priority Data

Mar. 7, 2013 (JP) ................................. 2013-045713

(51) Int. Cl.
*B65H 63/036* (2006.01)
*G01M 11/08* (2006.01)

(52) U.S. Cl.
CPC ......... *B65H 63/036* (2013.01); *G01M 11/088* (2013.01); *B65H 2701/32* (2013.01)

(58) Field of Classification Search
CPC .... B65H 63/02; B65H 63/024; B65H 63/036; B65H 2701/32; G01M 11/088
See application file for complete search history.

(56) References Cited

U.S. PATENT DOCUMENTS

| 5,322,228 A * | 6/1994 | Nagayama | ............. B65H 54/88 242/476.6 |
| 5,964,431 A * | 10/1999 | Chang | .................... B65H 54/72 226/89 |

(Continued)

FOREIGN PATENT DOCUMENTS

| CN | 102187256 A | 9/2011 |
| EP | 0514858 A2 | 11/1992 |

(Continued)

OTHER PUBLICATIONS

Communication dated Jul. 28, 2015 from the Japanese Patent Office issued in corresponding application No. 2013-045713.

(Continued)

*Primary Examiner* — William E Dondero
*Assistant Examiner* — Nathaniel Adams
(74) *Attorney, Agent, or Firm* — Sughrue Mion, PLLC

(57) ABSTRACT

An optical fiber screening test method in which while continuously travelling, an optical fiber passes a tension applying section which applies tension and the optical fiber which has passed the tension applying section is continuously wound by a winding bobbin is provided. The method includes running the optical fiber to which the tension has been applied along a first pulley and a second pulley sequentially, winding the optical fiber by the winding bobbin, and stopping rotation of the winding bobbin when the optical fiber is broken by applying the tension, and performing an adjustment so that an already-wound outer circumferential surface of the winding bobbin on which the optical fiber is already wound is not positioned on an extension line of a linear optical fiber travelling path from the first pulley to the second pulley at a time when the rotation of the winding bobbin is stopped.

2 Claims, 8 Drawing Sheets

(56) References Cited

U.S. PATENT DOCUMENTS

| | | | |
|---|---|---|---|
| 6,499,688 B1* | 12/2002 | Bissell | B65H 54/2803 242/471 |
| 2002/0069674 A1* | 6/2002 | Guy | B65H 67/06 65/377 |
| 2006/0147166 A1* | 7/2006 | Roba | B65H 49/02 385/123 |
| 2011/0198766 A1 | 8/2011 | Koshimizu et al. | |

FOREIGN PATENT DOCUMENTS

| | | |
|---|---|---|
| JP | 10-114537 A | 5/1998 |
| JP | 2001341940 A | 12/2001 |
| JP | 2004-059243 A | 2/2004 |
| JP | 2005-119831 A | 5/2005 |
| JP | 4822526 B2 | 11/2011 |

OTHER PUBLICATIONS

Communication dated Nov. 3, 2015, issued by the State Intellectual Property Office of the P.R.C. in corresponding Chinese Application No. 201410078838.2.
Communication dated Apr. 14, 2015, issued by the Japanese Patent Office in counterpart Japanese application No. 2013-045713.

* cited by examiner

-- PRIOR ART --

[L1=2πr]

OPTICAL FIBER SCREENING TEST METHOD AND OPTICAL FIBER SCREENING TEST APPARATUS

CROSS REFERENCE TO RELATED APPLICATIONS

Priority is claimed on Japanese Patent Application No. 2013-045713, filed on Mar. 7, 2013, the contents of which are incorporated herein by reference.

BACKGROUND OF THE INVENTION

Field of the Invention

The present invention relates to a screening test method and a screening test apparatus used to detect a low-strength portion in an optical fiber.

Description of Related Art

In a process of manufacturing an optical fiber, in order to ensure the strength of the optical fiber to be shipped as a product, while the optical fiber travels continuously in the final manufacturing stage, a tensile test is continuously conducted by applying tension to the optical fiber to break a low-strength portion and remove the broken optical fiber or the vicinity of the broken portion. This type of continuous tensile test is referred to as a screening test.

As a typical example of the screening test apparatus, for example, there has been known an apparatus shown in FIG. 1.

In a screening test apparatus S shown in FIG. 1, an optical fiber 1 to which a screening test method is applied is continuously fed from a sending side bobbin 3, passes a dancer device 5, and travels continuously while sequentially running along a sending side belt lap type capstan 7, a plurality of turn pulleys 9a to 9e, and a receiving side belt lap type capstan 11. Further, the optical fiber sequentially runs along a first pulley 21 and a second pulley 22 on the receiving side and wound by a winding bobbin 23. Then, for example, a weight 13, as tension applying means, is provided to any turn pulley of the plurality of turn pulleys 9a to 9e between the sending side belt lap type capstan 7 and the receiving side belt lap type capstan 11, for example, to the turn pulley 9d, and predetermined tension is forcibly applied to the optical fiber 1 between the sending side belt lap type capstan 7 and the receiving side belt lap type capstan 11. Accordingly, in the example of FIG. 1, a portion from the sending side belt lap type capstan 7 to the receiving side belt lap type capstan 11 corresponds to a tension applying section 15.

Here, when there is a low-strength portion in the optical fiber 1 which is supplied to a screening test, the low-strength portion of the optical fiber 1 is broken by the tension applied in the tension applying section 15 between the sending side belt lap type capstan 7 and the receiving side belt lap type capstan 11. Accordingly, the optical fiber which is finally wound by the winding bobbin 23 is an optical fiber of which the strength is ensured.

In the optical fiber screening test, when the optical fiber is broken, a phenomenon that a broken terminal portion of the optical fiber (a ruptured end portion) beats the normal optical fiber (an optical fiber on an outer circumference of the winding bobbin) which has already been wound around the winding bobbin 23, that is, a phenomenon referred to as fiber beating, occurs in some cases. When the fiber beating occurs, the optical fiber which has been already wound around the winding bobbin 23 is damaged or the performance is deteriorated, and thus, there is a concern that a defective product may be manufactured.

The fiber beating phenomenon is generally considered as follows.

That is, in the screening test, when the optical fiber is broken on the way, the ruptured end is in a free state in which the end is not restricted by external force. Therefore, when the rotation of the winding bobbin is not stopped before the terminal portion of the ruptured end reaches the winding bobbin, a phenomenon that the terminal portion of the ruptured end of the optical fiber rotates with the rotation of the winding bobbin while moving violently on an outer circumference of the optical fiber which has already been wound around the winding bobbin (this phenomenon is referred to as "co-rotation" below) occurs. The terminal portion of the ruptured end of the optical fiber which is co-rotated while moving violently beats the optical fiber which has been already wound around the winding bobbin 23 in some cases.

In order to prevent the fiber beating from occurring in the optical fiber screening test, when the optical fiber is broken on the way, it has been performed that the rotation of the winding bobbin is stopped by increasing a deceleration rate of a speed reducer in a drive system of the winding bobbin 23, or by applying mechanical or electrical control (braking) to the winding bobbin 23 by detecting the breakage by any breakage detecting means in the related art. However, actually, some time is required from when the optical fiber is broken and the breakage is detected to when the rotation of the winding bobbin 23 is decreased and the rotation of the winding bobbin is actually stopped. Therefore, when the rotation of the winding bobbin is not actually stopped, the ruptured end of the optical fiber reaches the winding bobbin and fiber beating occurs.

Particularly, in recent years, a travelling speed of the optical fiber has increased in the screening test with an increase in a process rate of manufacturing an optical fiber, and the screening test is conducted while the optical fiber continuously travels at several tens of m/sec or higher. Therefore, an impact of the above-described fiber beating is large and thus, there is a very high concern that the optical fiber on the winding bobbin may be damaged when the fiber beating occurs. In addition, when the screening test is conducted while the optical fiber continuously travels at a high speed of several tens of m/sec or higher, the travelling distance of the ruptured end of the optical fiber is significantly increased from the occurrence of the breakage to the actual stop of the rotation of the winding bobbin. Therefore, the rotation of the winding bobbin cannot be stopped in most cases before the ruptured end reaches the winding bobbin, and as a result, the frequency of fiber beating increases.

As the related art which prevents fiber beating from occurring when breakage occurs in the optical fiber screening test, there is disclosed a technique in Japanese Unexamined Patent Application, First Publication No. H10-114537.

In the technique in Japanese Unexamined Patent Application, First Publication No. H10-114537, a length of a travelling path (a pass line) of an optical fiber from a place for breaking a low-strength portion of the optical fiber (a screening wheel) is extended (pass line extending means) to a winding bobbin to control the length of the optical fiber travelling path from the broken place to the winding bobbin to be longer than a winding length of the optical fiber from when the optical fiber is broken to when the optical fiber is wounded around the winding bobbin. In order to realize such control, there is disclosed means, by providing winding amount detecting means used to detect a winding amount of the winding bobbin, used to control braking of the winding bobbin according to the detection at the time of breakage, or the like.

However, even when the rotation of the winding bobbin is stopped before the ruptured end of the optical fiber reaches the winding bobbin by applying the method proposed in Japanese Unexamined Patent Application, First Publication No. H10-114537, actually, it is difficult to reliably prevent fiber beating from occurring. That is, when the rotation of the winding bobbin is stopped before the ruptured end of the optical fiber reaches the winding bobbin, the ruptured terminal portion of the optical fiber, which still remains without being wound around the winding bobbin at the time point at which the rotation of the winding bobbin is stopped, flies linearly toward the winding bobbin at a moment in which the winding bobbin is stopped by the linear inertial force in a travelling direction of the optical fiber until the moment. Therefore, there is a possibility of fiber beating occurring.

In addition, when the method proposed in Japanese Unexamined Patent Application, First Publication No. H10-114537 is actually applied, extension of the pass line is caused, and the size of equipment and the cost of equipment increase. Further, since it is necessary to extend the pass line, it is difficult to apply the method to an existing screening test apparatus.

In contrast, in Japanese Unexamined Patent Application, First Publication No. 2004-59243, there is disclosed a technique used to control the rotation of a winding bobbin to be stopped before a ruptured end of an optical fiber reaches the winding bobbin in the same manner as described above. Further, it is proposed that a fiber beating preventing cover having a gap through which the optical fiber can pass without being in contact with the gap is provided immediately before the winding bobbin, and the rotation of the winding bobbin is stopped before the ruptured end of the optical fiber passes through the preventing cover.

According to the technique proposed in Japanese Unexamined Patent Application, First Publication No. 2004-59243, fiber beating may be prevented by co-rotation with the rotation of the winding bobbin and also, fiber beating caused by the above-described linear inertial force may be prevented to some extent.

However, even according to the technique proposed in Japanese Unexamined Patent Application, First Publication No. 2004-59243, it is difficult to reliably and stably prevent fiber beating. That is, the fiber beating occurring when the rotation of the winding bobbin is stopped before the ruptured end of the optical fiber reaches the winding bobbin is caused not only by the linear inertial force of the optical fiber at the time when the rotation of the winding bobbin is stopped as described above. That is, a phenomenon that, while moving violently, a terminal portion of the ruptured end is wound around an outer circumference of the winding bobbin which has been already stopped by the inertial force in a rotation direction of the winding bobbin, and at this time, the free terminal portion of the ruptured end of the optical fiber beats the already-wound fiber, also causes fiber beating. Particularly, when a travelling speed (line speed) of the optical fiber is high, the above-described phenomenon occurs easily. However, the fiber beating caused by the inertial force in the rotation direction cannot be prevented in the technique disclosed in Japanese Unexamined Patent Application, First Publication No. 2004-59243.

In addition, when the technique disclosed in Japanese Unexamined Patent Application, First Publication No. 2004-59243 is applied to an existing screening test apparatus, it is difficult to add the fiber beating preventing cover.

The present invention has been made in consideration of the above-described circumstances and provides a method capable of reliably and stably preventing fiber beating with a rotation stop of a winding bobbin when a low-strength portion in an optical fiber is broken during a screening test of the optical fiber, and of preventing the fiber beating without extension of a pass line, an increase in the cost of equipment, and difficulty in application to an existing screening test apparatus, and an apparatus used to implement the method.

Herein, the inventors have intensively analyzed and studied a phenomenon that, when an optical fiber is broken in an optical fiber screening test, a terminal portion of a broken place collides with an optical fiber which has been already wound around a winding bobbin, that is, causes of fiber beating, and as a result, it is determined that roughly the following three phenomena cause the fiber beating.

A first phenomenon is that the rotation of the winding bobbin is not stopped before the ruptured end of the optical fiber reaches the winding bobbin, and the terminal portion of the optical fiber beats the already-wound fiber such that while moving violently, the broken free terminal portion rotates with the rotation of the winding bobbin on the outer circumference of the winding bobbin, as described above.

A second phenomenon is that even when the rotation of the winding bobbin is stopped before the ruptured end of the optical fiber reaches the winding bobbin, the terminal portion of the optical fiber on the ruptured side, which remains without being wound around the winding bobbin until the rotation of the winding bobbin is stopped, flies linearly toward the winding bobbin by the linear inertial force, which is caused by travelling toward the winding bobbin until the rotation stop, at the time when the winding bobbin is stopped, and collides with the optical fiber which has been already wound around the winding bobbin.

A third phenomenon is that even when the rotation of the winding bobbin is stopped before the ruptured end of the optical fiber reaches the winding bobbin similar to the above description, while moving violently, the terminal portion of the optical fiber on the ruptured side, which remains without being wound around the winding bobbin until the rotation of the winding bobbin is stopped, is wound around the outer circumference of the winding bobbin which has been already stopped by the inertial force in the rotation direction of the winding bobbin, with the rotation of the winding bobbin until the rotation stop. During the winding, the free terminal portion of the ruptured end of the optical fiber beats the already-wound fiber. When the line speed is high, this phenomenon is significant.

Among the three phenomena, the fiber beating caused by the first phenomenon can be solved by stopping the rotation of the winding bobbin before the ruptured end of the optical fiber reaches the winding bobbin as shown in the above-described Japanese Unexamined Patent Application, First Publication No. H10-114537 and Japanese Unexamined Patent Application, First Publication No. 2004-59243.

On the other hand, both the fiber beating caused by the second phenomenon and the fiber beating caused by the third phenomenon are phenomena that can occur even when the rotation of the winding bobbin is stopped before the ruptured end of the optical fiber reaches the winding bobbin. Accordingly, in the technique disclosed in Japanese Unexamined Patent Application, First Publication No. H10-114537, it is difficult to prevent the fiber beating from occurring. In addition, in the technique disclosed in Japanese Unexamined Patent Application, First Publication No. 2004-59243, the fiber beating caused by the second phenomenon, that is, the fiber beating caused by the linear inertial force of the optical fiber at the time when the rotation of the winding bobbin is stopped can be prevented to some extent by providing the fiber beating preventing cover on an upstream side of the winding bobbin. However, the technique does not always reliably prevent the fiber beating and further, the fiber beating caused by the third phenomenon, that is, the fiber beating caused by the inertial force of the optical fiber in the rotation direction of the winding bobbin at the time when the rotation of the winding bobbin is stopped cannot be prevented.

Accordingly, when the above-described three phenomena can be avoided from occurring simultaneously, it is considered that fiber beating can be reliably and stably prevented.

SUMMARY

According to the present invention, the above-described three phenomena can be avoided from occurring and fiber beating can be reliably and stably prevented by appropriately adjusting an arrangement relationship and the distance between the winding bobbin and two pulleys on the upstream side thereof, that is, an optical fiber travelling path to the winding bobbin.

The first aspect of the present invention is an optical fiber screening test method in which while continuously travelling, an optical fiber passes a tension applying section which applies tension and the optical fiber which has passed the tension applying section is continuously wound by a winding bobbin. The method includes wrapping the optical fiber to which the tension has been sequentially applied around a first pulley and a second pulley, winding the optical fiber by the winding bobbin, and stopping rotation of the winding bobbin when the optical fiber is broken by applying the tension, performing an adjustment so that an already-wound outer circumferential surface of the winding bobbin on which the optical fiber is already wound is not positioned on an extension line of a linear optical fiber travelling path from the first pulley to the second pulley at a time when the rotation of the winding bobbin is stopped, setting lengths L0, L1, L2, and L3 to L0: a length of the optical fiber remaining from a broken portion of the optical fiber to the winding bobbin in the optical fiber travelling path at the time when the rotation of the winding bobbin is stopped, L1: a circumferential length of the already-wound outer circumferential surface of the winding bobbin at the time when the rotation of the winding bobbin is stopped, L2: a length of the linear optical fiber travelling path from a wrapping surface of the first pulley to a wrapping surface of the second pulley, and L3: a length of the linear optical fiber travelling path from the wrapping surface of the second pulley to the already-wound outer circumferential surface of the winding bobbin at the time when the rotation of the winding bobbin is stopped; and performing an adjustment so that the lengths L0, L1, L2, and L3 satisfy the following Expressions (1) to (3) at the time when the rotation of the winding bobbin is stopped, $$L0 > L1 \tag{1}$$

$$L3 < L1 \times \tfrac{1}{2} \tag{2}$$

$$L3 < L2 \tag{3}$$

In the second aspect of the present invention, in the above-described first aspect, at least one of the first pulley and the second pulley is moved during a winding period by the winding bobbin or at the time when breakage of the optical fiber is detected in the tension applying section.

The third aspect of the present invention is an optical fiber screening test apparatus including a tension applying section which applies tension to an optical fiber, a first pulley which wraps up the optical fiber which has passed the tension applying section, a second pulley which wraps up the optical fiber which has passed the first pulley, and a winding bobbin which continuously winds the optical fiber which has passed the second pulley and stops rotation when the optical fiber is broken by applying the tension. An already-wound outer circumferential surface of the winding bobbin on which the optical fiber is already wound is not positioned on an extension line of a linear optical fiber travelling path from the first pulley to the second pulley at a time when the rotation of the winding bobbin is stopped, lengths L0, L1, L2, and L3 are set to L0: a length of the optical fiber remaining from a broken portion of the optical fiber to the winding bobbin in the optical fiber travelling path at the time when the rotation of the winding bobbin is stopped, L1: a circumferential length of the already-wound outer circumferential surface of the winding bobbin at the time when the rotation of the winding bobbin is stopped, L2: a length of the linear optical fiber travelling path from a wrapping surface of the first pulley to a wrapping surface of the second pulley, and L3: a length of the linear optical fiber travelling path from the wrapping surface of the second pulley to the already-wound outer circumferential surface of the winding bobbin at the time when the rotation of the winding bobbin is stopped, and the lengths L0, L1, L2, and L3 satisfy the following Expressions (1) to (3) at the time when the rotation of the winding bobbin is stopped, $$L0 > L1 \tag{1}$$

$$L3 < L1 \times \tfrac{1}{2} \tag{2}$$

$$L3 < L2 \tag{3}$$

In the fourth aspect of the present invention, in the above-described first aspect, at least one of a rotation center position of the first pulley and a rotation center position of the second pulley is movable, and at least one of the first pulley and the second pulley is moved during a winding period by the winding bobbin or at the time when breakage of the optical fiber is detected in the tension applying section.

The fifth aspect of the present invention further includes, in the above-described third or fourth aspect, a buffering member which is arranged in a region between a line segment and an outer circumferential surface of a winding drum. The rotation center of the winding bobbin is set to a center point, an outer circumference of the winding drum of the winding bobbin is set to a base circle, and a winding starting point of the optical fiber in the winding drum is set to a starting point of an involute development locus. When the optical fiber travelling path from the second pulley to the winding bobbin is an internal common tangent of a circle formed by an outer circumferential surface of the second pulley and a circle formed by the already-wound outer circumferential surface of the winding bobbin, an involute curve that is developed in the same direction as a winding direction of the winding bobbin is defined, and when the optical fiber travelling path from the second pulley to the winding bobbin is an external common tangent of the circle formed by the outer circumferential surface of the second pulley and the circle formed by the already-wound outer circumferential surface of the winding bobbin, an involute curve that is developed in a direction opposite to the winding direction of the winding bobbin is defined. The line segment is stretched from any one of a position in which a development angle in the involute curve is 360° and a position at which the involute curve initially intersects with the extension line of the linear optical fiber travelling path from the first pulley to the second pulley, which is closer to the starting point, to the starting point on the involute curve.

According to the screening test method and the apparatus of the present invention, when the optical fiber is subjected to the screening test, it is possible to reliably and stably prevent the phenomenon that when the low-strength portion of the optical fiber is broken during the screening test of the optical fiber, the terminal portion of the ruptured end of the optical fiber collides with the optical fiber which has been already wound around the winding bobbin with the rotation stop of the winding bobbin to damage or deteriorate the already-wound optical fiber, that is, the fiber beating from occurring. Further, the fiber beating can be prevented while extension of the pass line, an increase in the cost of equipment, and difficulty in application to an existing screening test apparatus are prevented.

DETAILED DESCRIPTION OF THE PREFERRED EMBODIMENTS

Hereinafter, embodiments of the present invention will be described in detail with reference to drawings.

Figure 2:
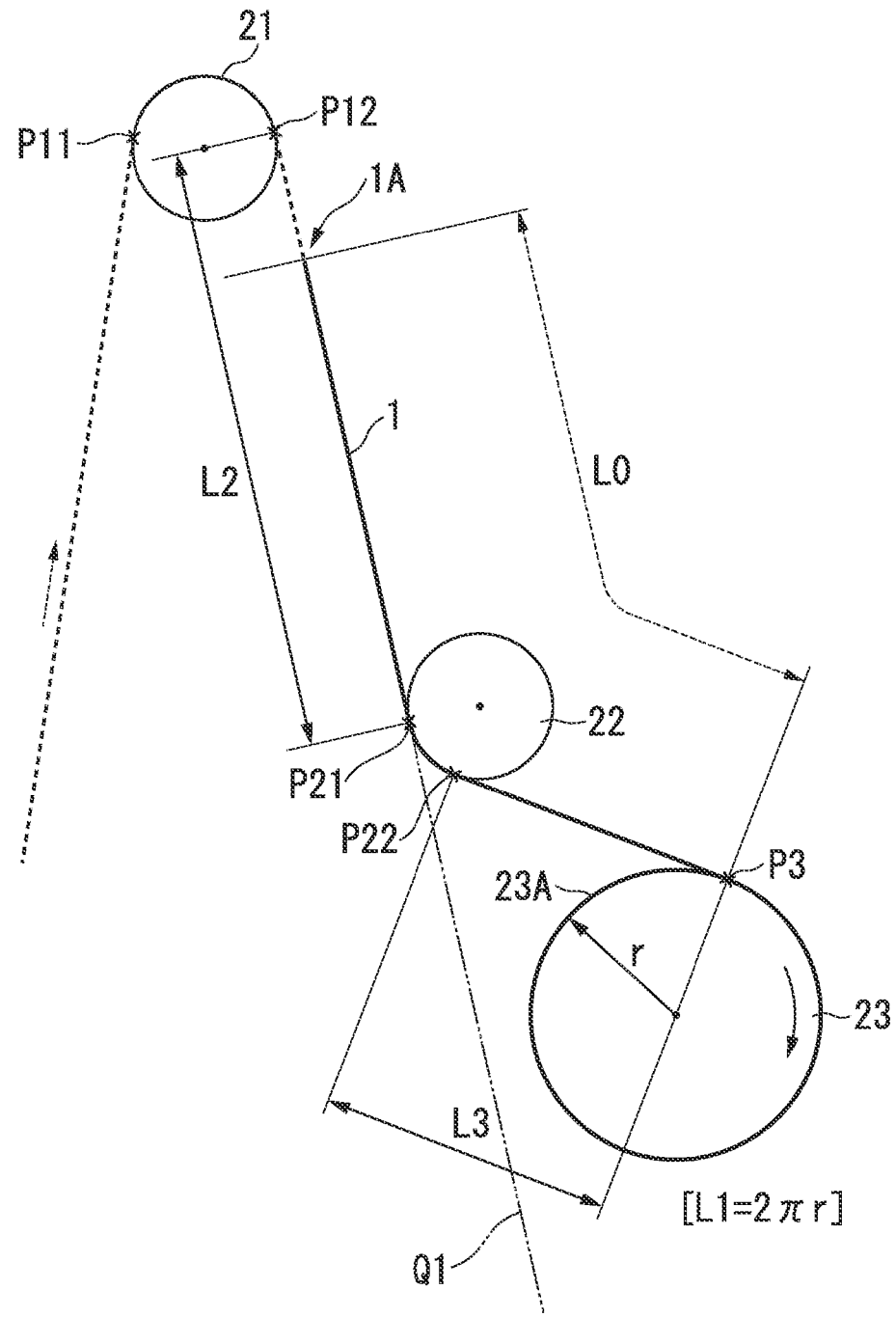
FIG. 2 is a schematic view showing an example of a state in which a first embodiment of the screening test method of the present invention is implemented (a first implementation state).

FIG. 2 shows a first implementation state of a first embodiment of an optical fiber screening test method in the present invention, and particularly, a state at the time when the rotation of the winding bobbin 23 is stopped after the optical fiber is broken.

Figure 1:
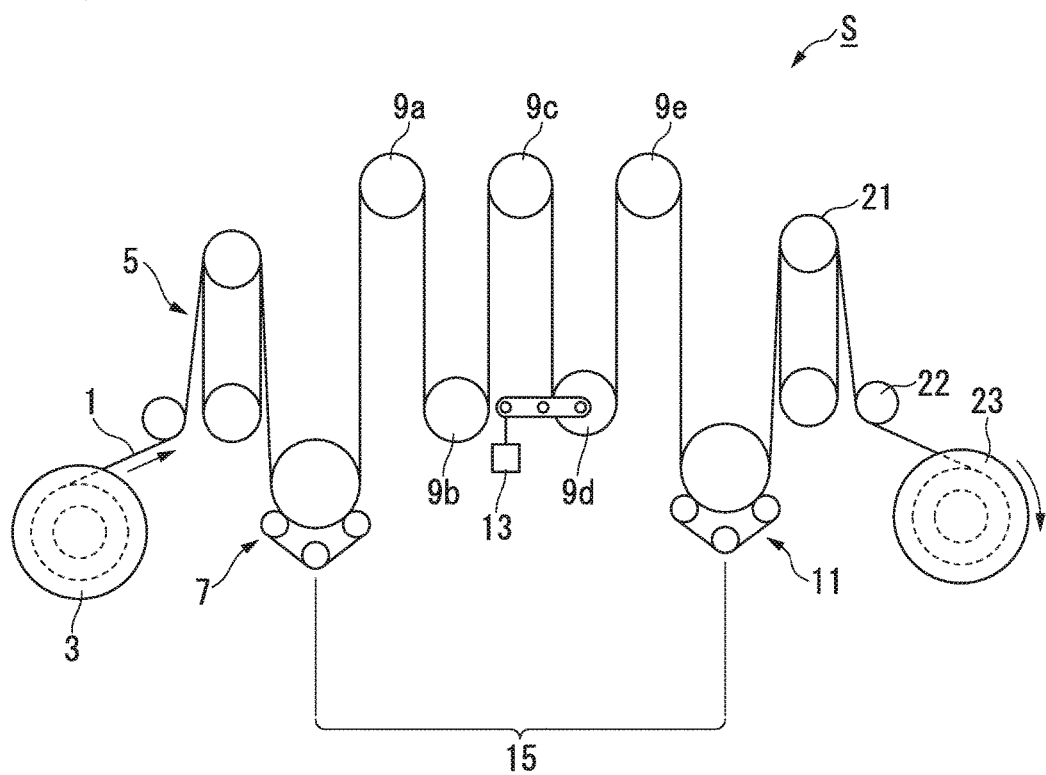
FIG. 1 is a schematic view showing an example of an entire configuration of a screening test apparatus to which a screening test method of the present invention is applied.

In FIG. 2, only parts of the first pulley 21, the second pulley 22, and the winding bobbin 23 in the screening test apparatus S shown in FIG. 1 are shown. The entire configuration of the screening test apparatus S may be the same as the configuration shown in FIG. 1. However, the entire configuration of the screening test apparatus is not limited to the configuration shown in FIG. 1, and the configuration has the tension applying section 15 that applies tension to the optical fiber 1 for the screening test during the continuous travelling of the optical fiber 1, and the first pulley 21, the second pulley 22, and the winding bobbin 23 may be arranged on a downstream side of the tension applying section 15 in order.

The position of the first pulley 21 may be fixed. In addition, the first pulley may be a movable type pulley which also serves as a dancer roll which adjusts or stabilizes the tension of the optical fiber 1 on the downstream side of the tension applying section 15. Further, the position of the second pulley 22 is fixed, but the second pulley may be a movable type in some cases. Further, the winding bobbin 23 is configured to rotate in the winding direction of the optical fiber by a rotary drive section (not shown) and to stop rotating properly by a speed reducer or a mechanical or electrical braking unit (a brake) so that the winding of the optical fiber 1 is stopped. Also, the winding bobbin 23 may be a so-called traverse movable type in which the bobbin reciprocates in a direction parallel to the rotation axis thereof during a winding period and a wrapping position of the optical fiber 1 is moved in a direction parallel to the rotation axis direction (the width direction). On the hand, when the winding bobbin 23 is not the traverse movable type, the winding bobbin may be a traverse type in which the second pulley 22 on the upstream side of the winding bobbin 23 reciprocates in a direction parallel to a central axis and the wrapping position of the optical fiber 1 is moved.

In FIG. 2, the optical fiber 1 continuously travels from the tension applying section 15 (refer to FIG. 1) to the downstream side of the progressing direction. The optical fiber 1 first run along the first pulley 21 and the travelling direction thereof is converted, and then, the optical fiber runs along the second pulley 22 again and the travelling direction is converted. Finally, the optical fiber is wound around the winding bobbin 23. Here, a position in which the optical fiber 1 is in contact with a wrapping surface of the first pulley 21 (wrapping start point) is set to P11, and a position in which the optical fiber 1 is separated from the wrapping surface of the first pulley 21 (wrapping end point=winding separating point) is set to P12. In addition, a position in which the optical fiber 1 is in contact with a wrapping surface of the second pulley 22 (wrapping start point) is set to P21, and a position in which the optical fiber 1 is separated from the wrapping surface of the second pulley 22 (wrapping end point=winding separating point) is set to P22. Further, a position in which the optical fiber 1 starts to be wound around the winding bobbin 23 (winding start point) is set to P3.

In FIG. 2, the winding bobbin 23 in which a flange section included in a general winding bobbin is omitted is shown. That is, generally, this kind of winding bobbin is provided with flange sections at both ends of a cylindrical winding drum in an axial direction and the optical fiber is usually wound around an outer circumferential surface of the winding drum between the flange sections. Then, after the winding is started, an outer circumferential diameter (winding diameter) of the wound optical fiber increases gradually and in the middle of the winding (before the winding drum is full), a diameter of an outer circumferential surface of the optical fiber which has been already wound around the outer circumferential surface of the winding drum is usually smaller than a diameter of the flange section. Therefore, the position P3 in which the optical fiber 1 starts to be wound around the winding bobbin 23 after the winding is started (winding start point) is provided outside of an outer diameter of the winding drum and inside an outer circumferential edge of the flange section. In the screening test method of the present invention, the outer diameter of the winding drum of the winding bobbin 23 and the outer diameter of the flange section are not important. At the time point when the rotation of the winding bobbin 23 is stopped with the occurrence of breakage in the optical fiber 1 during the winding period, the position of a wound outer circumferential surface (hereinafter, referred to as "already-wound outer circumferential surface") 23A on which the optical fiber 1 has been already wound and a circumferential length of the already-wound outer circumferential surface 23A are important. In FIG. 2, the winding bobbin 23 in which the winding drum and the flange section are omitted is shown. The same applies to FIGS. 3 to 7 which will be described later.

In FIG. 2, a state at the time point when the optical fiber 1 is broken, and then, the rotation of the winding bobbin 23 is stopped as described above is shown. In FIG. 2, the broken portion of the terminal (the ruptured end) is indicated by a symbol 1A. In the optical fiber travelling path from the tension applying section (not shown) to the winding bobbin 23 through the first pulley 21 and the second pulley 22, a portion of the optical fiber 1 which still remains without being wound around the winding bobbin 23 is indicated by a thick solid line at the time point when the optical fiber is broken and the rotation of the winding bobbin is stopped. In addition, a portion in which the ruptured end 1A of the optical fiber 1 has already passed at the time point is indicated by a thick dashed line.

In the screening test method of the present invention, as shown in FIG. 2, an adjustment is performed such that the already-wound outer circumferential surface 23A of the winding bobbin 23 is not positioned on an extension line Q1 of the optical fiber linear travelling path from the first pulley 21 to the second pulley 22 at the time point when the optical fiber is broken and the rotation of the winding bobbin 23 is stopped. The extension line Q1 of the optical fiber linear travelling path from the first pulley 21 to the second pulley 22 can be paraphrased as an extension line of a line segment connecting the winding separating point P12 of the first pulley 21 and the wrapping start point P21 of the second pulley 22 (accordingly, in the first embodiment in FIG. 2, an internal common tangent of the wrapping surface of the first pulley 21 and the wrapping surface of the second pulley 22).

In this manner, when the rotation of the winding bobbin 23 is stopped, an adjustment is performed such that the already-wound outer circumferential surface 23A of the winding bobbin 23 is not positioned on the extension line Q1. In order for that to become possible, when the positions of the first pulley 21 and the second pulley 22 are fixed as described later, for example, the arrangement position of the first pulley 21, the second pulley 22 and the winding bobbin 23 are determined such that the wound outer circumferential surface is not positioned on the extension line Q1 in an assumed full wound state of the winding bobbin 23. Alternatively, the arrangement position of the first pulley 21, the second pulley 22 and the winding bobbin 23 may be determined such that the entire winding bobbin 23 including the flange section is not positioned on the extension line Q1. In addition, when either of or both the first pulley 21 and the second pulley 22 are a movable type (the position can be adjusted), either of or both the first pulley 21 and the second pulley 22 are continuously or gradually moved accompanying the progress of winding (thus, accompanying thickening in winding), and a control is performed such that the already-wound outer circumferential surface 23A of the winding bobbin 23 is not positioned on the extension line Q1 at any time during the winding period. Alternatively, a control may be performed such that the already-wound outer circumferential surface 23A of the winding bobbin 23 is not positioned on the extension line Q1 at the time when the rotation of the winding bobbin 23 is stopped by instantaneously moving either of or both the first pulley 21 and the second pulley 22 during the time from when the breakage of the optical fiber 1 is detected to when the rotation of the winding bobbin 23 is actually stopped.

Further, in the present invention, a length (or a distance) of each portion is defined as L0, L1, L2, and L3 at the time when the optical fiber 1 is broken and the rotation of the winding bobbin 23 is stopped, and relationships therebetween are determined. First, the length of each portion L0, L1, L2, and L3 will be described based on the embodiment shown FIG. 2.

L0: A length of the optical fiber remaining between the ruptured end 1A of the optical fiber 1 and the winding bobbin 23 in the optical fiber travelling path at the time when the optical fiber 1 is broken and the rotation of the winding bobbin 23 is stopped. That is, an actual length of the optical fiber 1 from the ruptured end 1A of the optical fiber 1 to the winding start point P3 in the winding bobbin 23 in FIG. 2.

L1: A circumferential length of the already-wound outer circumferential surface 23A of the winding bobbin 23 at the time when the optical fiber 1 is broken and the rotation of the winding bobbin 23 is stopped. That is, a length expressed by L1=2πr when a radius of an outer circumferential surface of the portion around which the optical fiber 1 wound around the winding bobbin 23 is wound until the time when the optical fiber 1 is broken and the rotation of the winding bobbin 23 is stopped is set to r.

L2: A length of a linear travelling path from the wrapping surface of the first pulley 21 to the wrapping surface of the second pulley 22. That is, a linear distance from the wrapping end point P12 of the first pulley 21 to the wrapping start point P21 of the second pulley 22. In the embodiment in FIG. 2, the length corresponds to a length of an internal common tangent between the surface of the first pulley 21 on which the optical fiber 1 is wrapped and the surface of the second pulley 22 on which the optical fiber 1 is wound.

L3: A length of a linear travelling path from the wrapping surface of the second pulley 22 to the outer circumferential surface 23A of the winding bobbin 23 on which the optical fiber is wound at the time when the optical fiber 1 is broken and the rotation of the winding bobbin 23 is stopped. That is, a linear distance from the wrapping end point P22 of the second pulley 22 to the winding start point P3 of the winding bobbin 23 at the time when the optical fiber 1 is broken and the rotation of the winding bobbin 23 is stopped. In the embodiment in FIG. 2, the length corresponds to a length of an internal common tangent between the surface of the second pulley 22 on which the optical fiber 1 is wrapped and the outer circumferential surface 23A of the winding bobbin 23 on which the optical fiber 1 is wound.

When L0, L1, L2, and L3 are defined in this manner, values of L0, L1, L2, and L3 are adjusted to satisfy the following Expressions (1) to (3) at the time when the optical fiber 1 is broken and the rotation of the winding bobbin is stopped.

$$L0 > L1 \quad (1)$$

$$L3 < L1 \times \tfrac{1}{2} \quad (2)$$

$$L3 < L2 \quad (3)$$

The condition of Expression (1) means that the length L0 of the ruptured end portion of the optical fiber which is not yet wound around the winding bobbin 23 is longer than the circumferential length L1 of the already-wound outer circumferential surface 23A of the winding bobbin 23 at the time when the optical fiber 1 is broken and the rotation of the winding bobbin 23 is stopped. Accordingly, when the rotation of the winding bobbin 23 is stopped while leaving a length equal to or longer than the outer circumferential length L1 of the optical fiber which has been already wound around the winding bobbin 23, the condition of Expression (1) is satisfied.

Also, the condition of Expression (2) means that the length L3 of the linear travelling path from the wrapping surface of the second pulley 22 to the outer circumferential surface 23A of the winding bobbin 23 on which the optical fiber is wound (the linear distance between P22 and P3) is shorter than a half of the outer circumferential length L1 of the optical fiber already wound around the winding bobbin 23 at the time when the optical fiber 1 is broken and the rotation of the winding bobbin 23 is stopped.

In addition, the condition of Expression (3) means that the length L3 of the linear travelling path from the wrapping surface of the second pulley 22 to the outer circumferential surface 23A of the winding bobbin 23 on which the optical fiber is wound (the linear distance between P22 and P3) is shorter than the length L2 of the linear travelling path from the wrapping surface of the first pulley 21 to the wrapping surface of the second pulley 22 (the linear distance between P12 and P21) at the time when the optical fiber 1 is broken and the rotation of the winding bobbin 23 is stopped.

The fiber beating caused by the first to third phenomena can be avoided by satisfying all the above-described respective conditions. Effects by each of the conditions will be described below in association with the first to third phenomena.

First, regarding the first phenomenon, when the condition of Expression (1) is satisfied, the rotation of the winding bobbin 23 is stopped while the ruptured end 1A portion of the broken optical fiber 1 is not fully wound around the winding bobbin 23. Therefore, it is possible to prevent the fiber beating caused by the co-rotation from occurring.

Next, regarding the second phenomenon, the length L0 which is longer than the circumferential length L1 of the already-wound outer circumferential surface of the winding bobbin remains at the time when the rotation of the winding bobbin is stopped by satisfying the condition of Expression (1). Further, by satisfying the condition of Expression (2), the length L3 of the linear travelling path from the wrapping surface of the second pulley 22 to the outer circumferential surface 23A of the winding bobbin 23 on which the optical fiber is wound (the linear distance between P22 and P3) is set to be shorter than ½ of the circumferential length L1 of the already-wound outer circumferential surface of the winding bobbin. Thus, the rotation of the winding bobbin 23 is stopped at the timing at which the ruptured end 1A of the optical fiber 1 is positioned on the upstream side of the second pulley 22 when the rotation of the winding bobbin 23 is stopped. Precisely, the rotation of the winding bobbin 23 is stopped at the timing at which the ruptured end 1A of the optical fiber 1 is positioned on the upstream side of the winding separating point P22 of the second pulley 22 and at a position distant by more than ½ of the circumferential length L1 of the already-wound outer circumferential surface 23A of the winding bobbin 23. In the actual screening test apparatus, the outer diameter of the second pulley 22 is usually shorter than the circumferential length L1 of the already-wound outer circumferential surface 23A of the winding bobbin 23. Also, the length of the optical fiber that is wrapped on the outer circumferential surface of the second pulley 22 (the length from the wrapping start point P21 to the winding separating point P22 in the circumferential direction) is also usually remarkably shorter than ½ of the circumferential length L1 of the already-wound outer circumferential surface 23A of the winding bobbin 23. Therefore, the rotation of the winding bobbin 23 is usually stopped at the timing at which the ruptured end 1A of the optical fiber 1 is positioned on the upstream side of the second pulley 22.

As described above, when the rotation of the winding bobbin 23 is stopped at the timing at which the ruptured end 1A of the optical fiber 1 is positioned on the upstream side of the second pulley 22, the inertial force in a linear direction from the first pulley 21 to the second pulley 22 is dominant in the inertial force of the ruptured end of the optical fiber at the time when the rotation of the winding bobbin 23 is stopped. Therefore, a direction component of the extension line Q1 of the linear line from the first pulley 21 to the second pulley 22 (P12 to P21) is dominant in a direction in which the ruptured end portion of the optical fiber flies by the inertial force at the time of the rotation stop.

Further, the length L2 of the linear travelling path from the wrapping surface of the first pulley 21 to the wrapping surface of the second pulley 22 (the linear distance between P12 and P21) is set to be longer than the length L3 of the linear travelling path from the wrapping surface of the second pulley 22 to the outer circumferential surface 23A of the winding bobbin 23 on which the optical fiber is wound (the linear distance between P22 and P3) by satisfying the condition of Expression (3). Accordingly, a motion direction by the inertial force is greatly influenced by the linear distance L2 between P12 and P21 that is relatively long as the linear distance compared to the linear distance L3 between P22 to P3 which is relatively short as the linear distance. From this fact, a directional component of the extension line Q1 of the linear line from the first pulley 21 to the second pulley 22 (P12 to P21) is dominant in a direction in which the ruptured end portion of the optical fiber flies by the inertial force at the time of the rotation stop.

In the present invention, an adjustment is performed such that the already-wound outer circumferential surface 23A of the winding bobbin 23 is not positioned on the straight extension line Q1 from the first pulley 21 to the second pulley 22. Therefore, it is possible to avoid the ruptured end portion of the optical fiber flying in a direction of the extension line Q1 colliding with the already-wound outer circumferential surface 23A of the winding bobbin 23. That is, the fiber beating caused by the linear inertial force at the time when the rotation of the winding bobbin is stopped can be prevented from occurring.

However, when the conditions of Expressions (1) and (2) are satisfied, the rotation of the winding bobbin 23 may be exceptionally stopped at the timing at which the ruptured end 1A of the optical fiber 1 is in contact with the second pulley 22 (that is, at the timing at which the ruptured end 1A is positioned between P21 and P22). The above-described case will be described later.

Further, the third phenomenon will be described.

The length L0 which is longer than the circumferential length L1 of the already-wound outer circumferential surface 23A remains at the time when the rotation of the winding bobbin 23 is stopped by satisfying the condition of Expression (1). Thus, energy is attenuated when the terminal portion is wrapped on the outer circumference of the winding bobbin 23 by the inertial force in the rotation direction of the winding bobbin at the time of rotation stop. As a result, the energy of fiber beating (collision energy) by the inertial force in the rotation direction is decreased and the fiber beating caused by the inertial force in the rotation direction is reduced. In a case of wires having a small diameter such as the optical fiber, the energy applied by the inertial force is significantly attenuated by air resistance action or a change in rotation in a motion direction.

Here, phenomena occurring when each of the conditions of Expressions (1) to (3) is not satisfied will be described.

When Expression (1) is not satisfied, particularly, when none of the terminal of the ruptured end 1A of the optical fiber 1 is left at the time when the rotation of the winding bobbin 23 is stopped, the fiber beating caused by the co-rotation in the first phenomenon occurs. In addition, even if the terminal of the ruptured end 1A of the optical fiber 1 remains at the time when the rotation of the winding bobbin 23 is stopped, when the length L0 is equal to or smaller than the circumferential length L1 of the already-wound outer circumferential surface 23A of the winding bobbin 23, the terminal reaches the winding bobbin 23 and fiber beating easily occurs while the energy is not sufficiently attenuated due to the interference of the terminal portion.

On the other hand, a case in which Expression (1) is satisfied and the length L0 of the terminal portion in the ruptured end 1A of the optical fiber 1 remaining at the time when the rotation of the winding bobbin 23 is stopped is longer than the circumferential length L1 of the already-wound outer circumferential surface 23A of the winding bobbin 23 will be described. Expression (2) is satisfied and the length L3 of the linear travelling path from the wrapping surface of the second pulley 22 to the outer circumferential surface 23A of the winding bobbin 23 on which the optical fiber is wound (the linear distance between P22 and P3) is set to be equal to or longer than ½ of the circumferential length of the already-wound outer circumferential surface 23A of the winding bobbin. In this case, at the timing of the start of winding, the length of the optical fiber remaining between the second pulley 22 and the winding bobbin 23 becomes longer than the length of the optical fiber 1 remaining between the first pulley 21 and the second pulley 22 in the length of the ruptured end of the optical fiber 1 which still remains without being wound around the winding bobbin 23 until the rotation of the winding bobbin 23 is stopped. The action of the inertial force toward the winding bobbin 23 at the time when the rotation of the winding bobbin 23 is stopped becomes strong, and conversely, there is a concern that fiber beating may occur. That is, at the time when the rotation of the winding bobbin 23 is stopped, an effect of performing an adjustment such that the outer circumferential surface 23A of the winding bobbin 23 on which the optical fiber 1 is already wound is not positioned on the extension line Q1 of the linear optical fiber travelling path from the first pulley 21 to the second pulley 22 cannot be exhibited.

In addition, it is described that a case in which fiber beating is prevented when Expression (2) is not satisfied and the length L3 of the linear travelling path from the wrapping surface of the second pulley 22 to the outer circumferential surface 23A of the winding bobbin 23 on which the optical fiber is wound (the linear distance between P22 and P3) is set to be equal to or longer than ½ of the circumferential length of the already-wound outer circumferential surface 23A of the winding bobbin 23 and Expression (2). The length of the ruptured end 1A of the optical fiber 1 which still remains without being wound around the winding bobbin 23 at the time when the rotation of the winding bobbin 23 is stopped has to be adjusted to be remarkably longer. In this case, the pass line is remarkably extended to cause an increase in the size of equipment and an increase in the cost of equipment and there is difficulty in application to an existing screening test apparatus. Further, it is necessary to stop the rotation of the winding bobbin 23 instantaneously at the timing when the breakage of the optical fiber 1 is detected, and deceleration at the time when the rotation of the winding bobbin 23 is stopped has to be increased. As a result, there is a concern that winding collapse may occur in the winding bobbin 23 at the time of the rotation stop.

Further, a case in which Expression (3) is not satisfied and the length L3 of the linear travelling path from the wrapping surface of the second pulley 22 to the outer circumferential surface 23A of the winding bobbin 23 on which the optical fiber is wound (the linear distance between P22 and P3) is equal to or longer than the length L2 of the linear travelling path from the wrapping surface of the first pulley 21 to the wrapping surface of the second pulley 22 (the linear distance between P12 and P21) will be described. In this case, the action of the inertial force toward the winding bobbin 23 at the time when the rotation of the winding bobbin 23 is stopped becomes strong, and fiber beating easily occurs. That is, at the time when the rotation of the winding bobbin 23 is stopped, an effect of performing an adjustment such that the outer circumferential surface 23A of the winding bobbin 23 on which the optical fiber 1 is already wound is not positioned on the extension line Q1 of the linear optical fiber travelling path from the first pulley 21 to the second pulley 22 cannot be exhibited.

As described above, while the conditions of Expressions (1) to (3) are satisfied, at the time when the rotation of the winding bobbin 23 is stopped, an adjustment is performed such that the outer circumferential surface 23A of the winding bobbin 23 on which the optical fiber 1 is already wound is not positioned on the extension line Q1 of the linear optical fiber travelling path from the first pulley 21 to the second pulley 22. Thus, it is possible to reliably prevent fiber beating from occurring.

Here, as long as each of the conditions of the present invention is satisfied, it is possible to reliably prevent fiber beating at the time when the rotation of the winding bobbin 23 is stopped without unnecessarily extending the ruptured end 1A portion of the optical fiber 1 remaining on the upstream side of the winding bobbin 23. Accordingly, it is not necessary to extend the pass line unnecessarily. As a result, the configuration can be easily applied to an existing screening test apparatus without causing an increase in the size of equipment and an increase in the cost of equipment.

In addition, even when the length of the ruptured end portion of the optical fiber 1 remaining on the upstream side of the winding bobbin 23 at the time when the rotation of the winding bobbin 23 is stopped is long, it is possible to reliably prevent fiber beating.

In the above description, the length of the linear travelling path of L2 and the length of the linear travelling path of L3 are used as factors of Expressions (2) and (3), and the length of the portion in which the optical fiber 1 is in contact with the second pulley 22 (the length from P21 to P22 in the circumferential direction) is ignored. However, since a useless increase in tension caused by rotational resistance is suppressed in a general screening test apparatus, an intermediate pulley diameter is suppressed to be small. Accordingly, the length of the above-described contact portion with the second pulley 22 is decreased, and thus, influence on fiber beating is reduced. In Expressions (2) and (3), the length of the contact portion with the second pulley 22 is ignored.

When the diameter of the second pulley 22 is large, the length of the portion in which the optical fiber 1 is in contact with the second pulley 22 may have influence on fiber beating. However, from the following reasons, the above-described length (the length from P21 to P22 in the circumferential direction) can be ignored.

That is, when a contact angle of the optical fiber 1 to the second pulley 22 is large, the length of the contact portion with the second pulley 22 is increased. In this case, the extension line Q1 of the linear optical fiber travelling path from the first pulley 21 to the second pulley 22 becomes far away from the linear travelling path from the warping surface of the second pulley 22 to the winding start point P3 of the winding bobbin 23. Therefore, fiber beating does not easily occur and thus, the length of the contact portion can be ignored. On the other hand, when the contact angle of the optical fiber 1 to the second pulley 22 is small, the extension line Q1 becomes closer to the linear travelling path from the warping surface of the second pulley 22 to the winding start point P3 of the winding bobbin 23. The small contact angle means that the length of the contact portion with the second pulley 22 is short, and thus, the above-described length can also be ignored in this case.

At a relatively early stage after the start of winding (that is, a stage in which the diameter of the already-wound outer circumferential surface 23A of the winding bobbin 23 is still small), or when the outer diameter of the second pulley 22 is large, even when Expressions (1) and (2) are satisfied, exceptionally, the rotation of the winding bobbin 23 may be stopped at the timing at which the ruptured end 1A of the optical fiber is in contact with the second pulley 22 (that is, at the timing at which the ruptured end 1A is positioned between P21 and P22). However, since the ruptured end 1A moves along the outer circumferential surface of the second pulley 22 immediately before the rotation stop, the force to move the ruptured end 1A of the optical fiber 1 in a direction away from the winding bobbin 23 acts by the centrifugal force and the rigidity of the optical fiber itself. Therefore, fiber beating rather does not occur. Accordingly, in the present invention, as long as each of the aforementioned conditions is satisfied, a problem of fiber beating can be avoided.

Further, in the first embodiment shown in FIG. 2, a state is shown in which the ruptured end 1A of the optical fiber 1 has already passed over the first pulley 21 and is positioned between the first pulley 21 and the second pulley 22 in the optical fiber travelling path at the time point when the optical fiber 1 is broken and the rotation of the winding bobbin 23 is stopped. However, in some cases, as a second implementation state shown in FIG. 3, the ruptured end 1A of the optical fiber 1 does not yet reach the first pulley 21 and is positioned on the upstream side of the first pulley 21 at the time when the rotation of the winding bobbin 23 is stopped. Even in such a case, it is possible to reliably prevent fiber beating by satisfying each of the above-described conditions.

Figure 3:
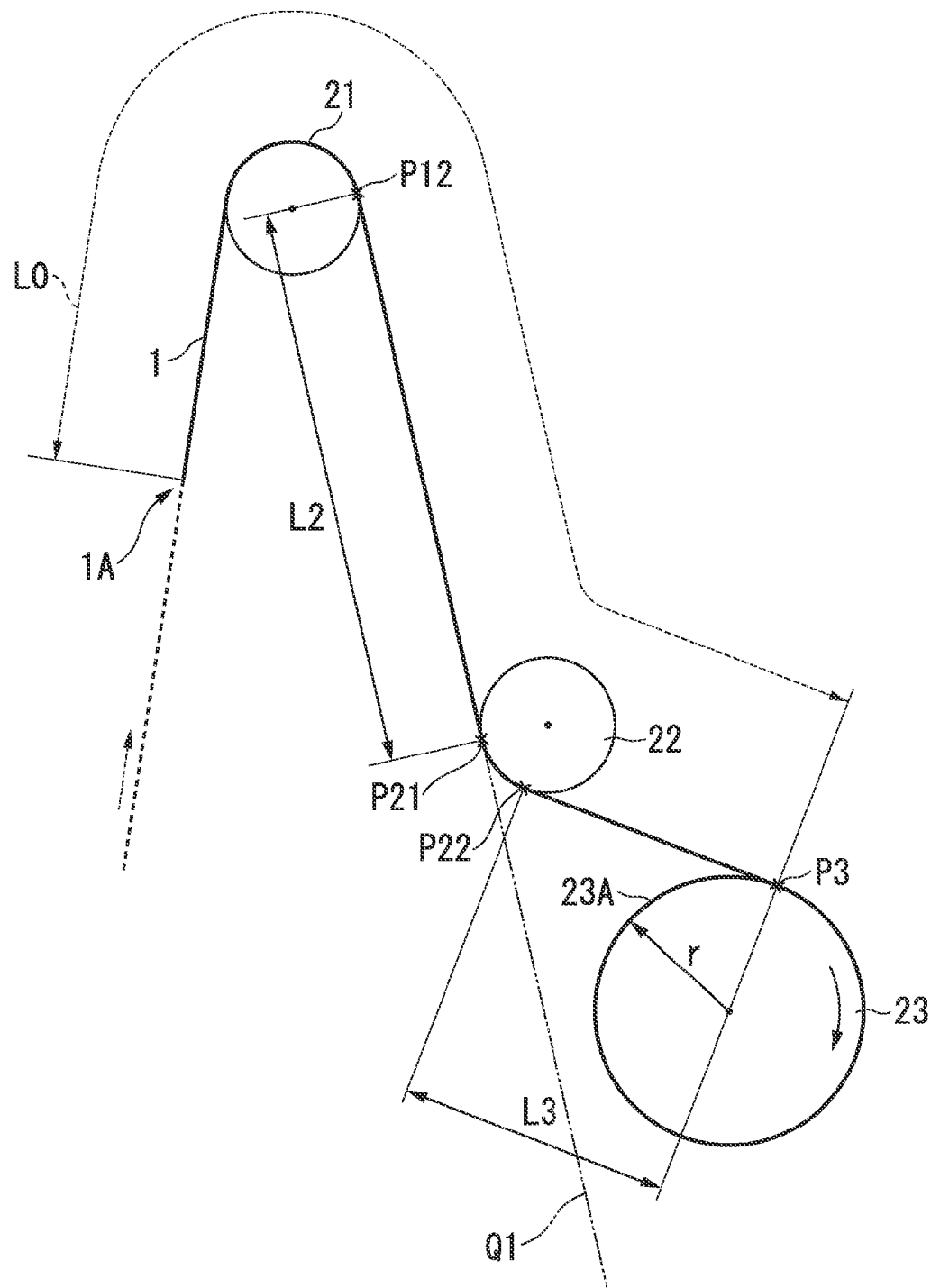
FIG. 3 is a schematic view showing another example of a state in which the first embodiment of the screening test method of the present invention is implemented (a second implementation state).

Here, as shown in FIG. 3, when the ruptured end 1A of the optical fiber 1 does not yet reach the first pulley 21 and is positioned on the upstream side of the first pulley 21 at the time when the rotation of the winding bobbin 23 is stopped, if the line speed is high and the rotation of the winding bobbin is stopped quickly, the ruptured end 1A of the optical fiber 1 is wrapped around (moves over) the first pulley 21 by the inertial force and the terminal portion of the ruptured end 1A faces the winding bobbin 23 in some cases. In the above-described state, when the terminal portion of the optical fiber 1 is in contact with a part of a configuration member in a peripheral apparatus and tension is applied to the optical fiber 1 again, frictional force with the first pulley 21 or the second pulley 22 increases. Propulsive force is applied to the optical fiber 1 due to the inertial rotation of the pulleys, and the terminal portion of the ruptured end easily moves at a high speed. In the present invention, the length L2 of the linear travelling path from the wrapping surface of the first pulley 21 to the wrapping surface of the second pulley 22 is greatly adjusted as defined in Expression (3). Therefore, even in the above-described case, a direction of inertial motion is controlled between the first pulley 21 and the second pulley 22. That is, regarding the inertial motion of the ruptured end of the optical fiber in the case, the direction of the linear extension line Q1 from first pulley 21 to the second pulley 22 can be dominant. As a result, it is possible to effectively prevent fiber beating.

Figure 4:
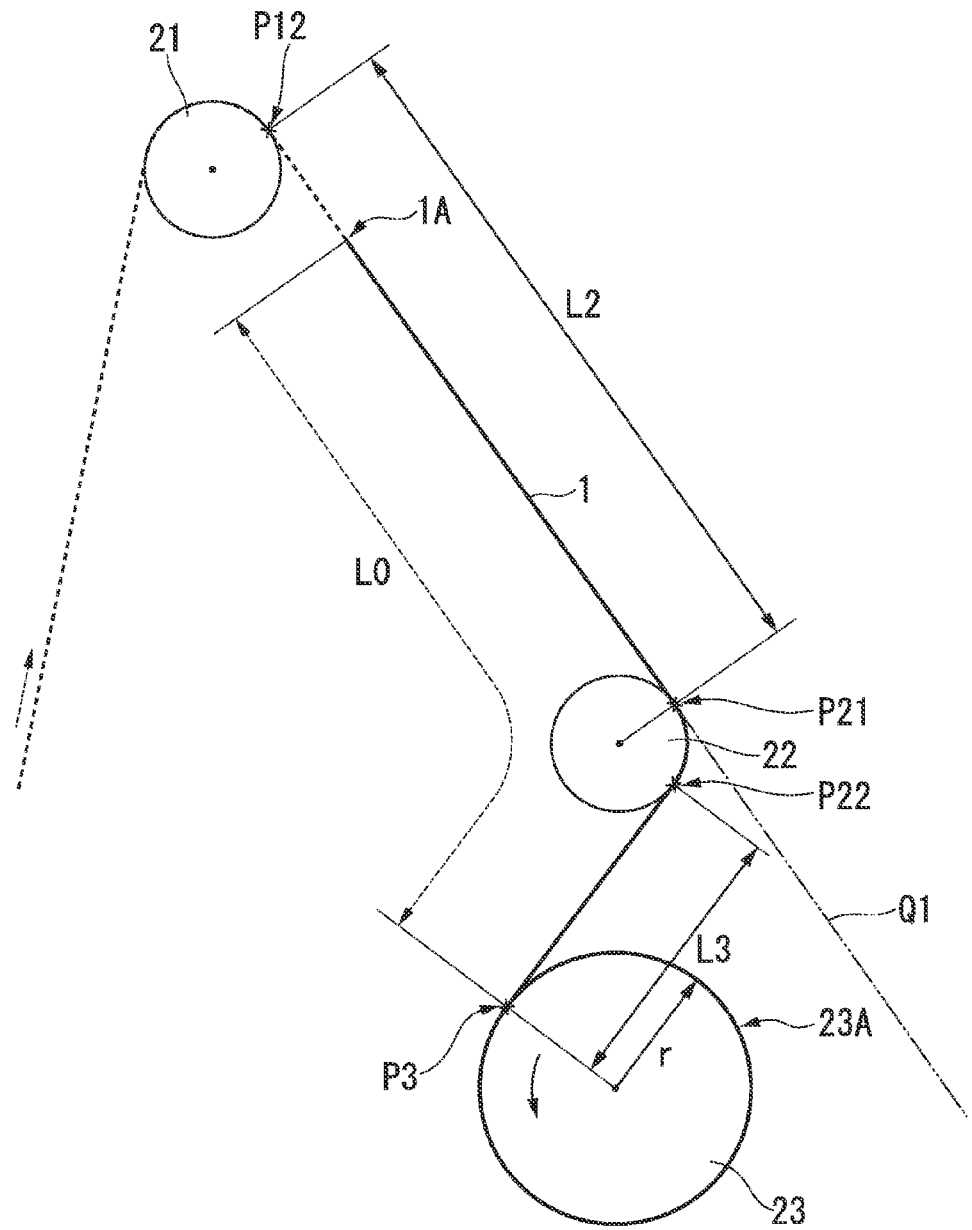
FIG. 4 is a schematic view showing an example of a state in which a second embodiment of the screening test method of the present invention is implemented.
Figure 5:
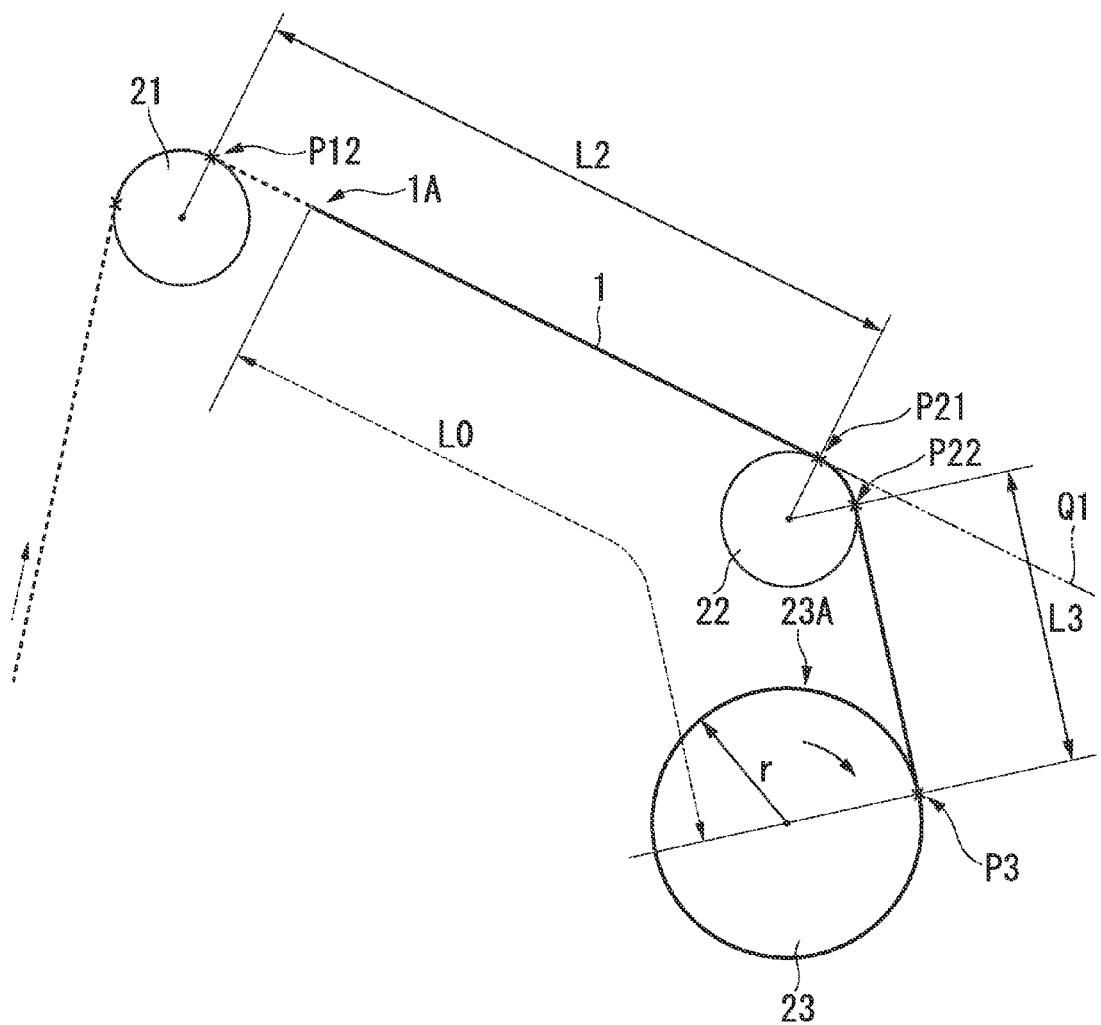
FIG. 5 is a schematic view showing an example of a state in which a third embodiment of the screening test method of the present invention is implemented.
Figure 6:
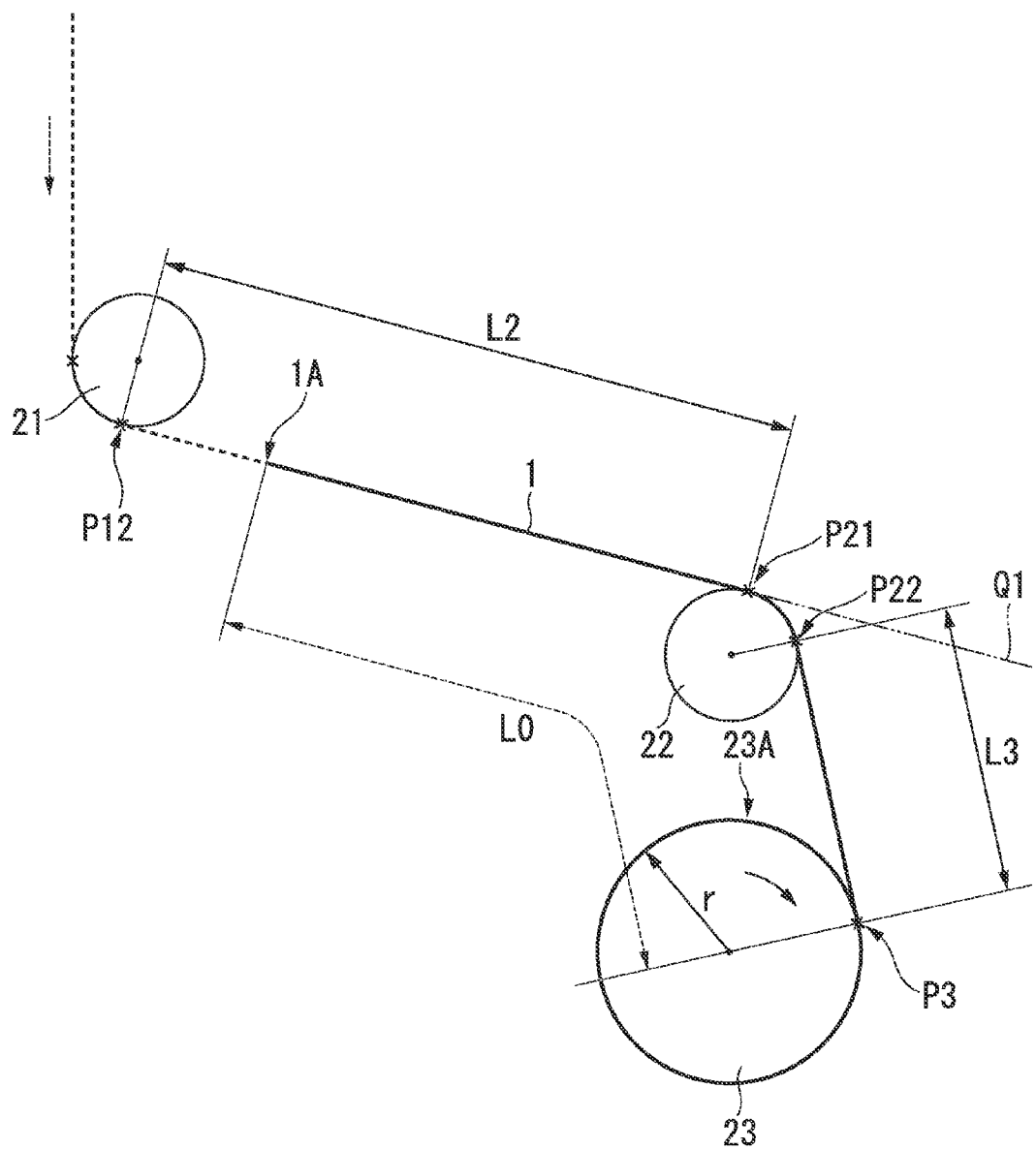
FIG. 6 is a schematic view showing an example of a state in which a fourth embodiment of the screening test method of the present invention is implemented.

Here, when the present invention is implemented, an arrangement relationship among the first pulley 21, the second pulley 22, and the winding bobbin 23, that is, a relationship among the pulleys, the wrapping of the bobbin, and the winding direction is not limited to a relationship shown in FIGS. 2 and 3 as the first embodiment. That is, relationships as shown in FIGS. 4 to 6 as second to fourth embodiments may be adopted. The arrangement relationship in each of the embodiments, including a case of the first embodiment, will be described below.

First Embodiment (FIGS. 2 and 3)

A case in which the rotation center of the first pulley 21 and the rotation center of the second pulley 22 are positioned on opposite sides from each other with respect to the travelling path of the optical fiber 1, and the rotation center of the second pulley 22 and the rotation center of the winding bobbin 23 are positioned on opposite sides from each other with respect to the travelling path of the optical fiber 1.

In this case, the linear travelling path (the length L2) from the surface of the first pulley 21 on which the optical fiber is wrapped to the surface of the second pulley 22 on which the optical fiber is wrapped corresponds to the internal common tangent between the wrapping surface of the first pulley 21 and the second pulley 22.

In addition, the linear travelling path (the length L3) from the wrapping surface of the second pulley 22 to the already-wound outer circumferential surface 23A of the winding bobbin 23 corresponds to the internal common tangent between the wrapping surface of the second pulley 22 and the already-wound outer circumferential surface 23A of the winding bobbin 23.

Second Embodiment (FIG. 4)

A case in which the rotation center of the first pulley 21 and the rotation center of the second pulley 22 are positioned on the same side with respect to the travelling path of the optical fiber 1, and the rotation center of the second pulley 22 and the rotation center of the winding bobbin 23 are positioned on the opposite sides from each other with the travelling path of the optical fiber 1 interposed therebetween.

In this case, the linear travelling path (the length L2) from the surface of the first pulley 21 on which the optical fiber is wrapped to the surface of the second pulley 22 on which the optical fiber is wrapped corresponds to an external common tangent between the wrapping surface of the first pulley 21 and the second pulley 22.

In addition, the linear travelling path (the length L3) from the wrapping surface of the second pulley 22 to the already-wound outer circumferential surface 23A of the winding bobbin 23 corresponds to the internal common tangent between the wrapping surface of the second pulley 22 and the already-wound outer circumferential surface 23A of the winding bobbin 23.

Third Embodiment (FIG. 5)

A case in which the rotation center of the first pulley 21 and the rotation center of the second pulley 22 are positioned on the same side with respect to the travelling path of the optical fiber 1, and the rotation center of the second pulley 22 and the rotation center of the winding bobbin 23 are positioned on the same side with respect to the travelling path of the optical fiber 1.

In this case, the linear travelling path (the length L2) from the surface of the first pulley 21 on which the optical fiber is wrapped to the surface of the second pulley 22 on which the optical fiber is wrapped corresponds to the external common tangent between the wrapping surface of the first pulley 21 and the second pulley 22.

In addition, the linear travelling path (the length L3) from the wrapping surface of the second pulley 22 to the already-wound outer circumferential surface 23A of the winding bobbin 23 corresponds to the external common tangent between the wrapping surface of the second pulley 22 and the already-wound outer circumferential surface 23A of the winding bobbin 23.

Fourth Embodiment (FIG. 6)

A case in which the rotation center of the first pulley 21 and the rotation center of the second pulley 22 are positioned on the opposite sides from each other with the travelling path of the optical fiber 1 interposed therebetween, and the rotation center of the second pulley 22 and the rotation center of the winding bobbin 23 are positioned on the same side with respect to the travelling path of the optical fiber 1.

In this case, the linear travelling path (the length L2) from the surface of the first pulley 21 on which the optical fiber is wrapped to the surface of the second pulley 22 on which the optical fiber is wrapped corresponds to the internal common tangent between the wrapping surface of the first pulley 21 and the second pulley 22.

In addition, the linear travelling path (the length L3) from the wrapping surface of the second pulley 22 to the already-wound outer circumferential surface 23A of the winding bobbin 23 corresponds to the external common tangent between the wrapping surface of the second pulley 22 and the already-wound outer circumferential surface 23A of the winding bobbin 23.

In all cases of the embodiments, as already described above, it is possible to reliably and stably prevent fiber beating by satisfying each of the conditions.

In FIGS. 4 to 6 showing the second to fourth embodiments, a state in which the ruptured end 1A of the optical fiber 1 has already passed over the first pulley 21 and is positioned between the first pulley 21 and the second pulley 22 in the optical fiber travelling path at the time when the optical fiber 1 is broken and the rotation of the winding bobbin 23 is stopped is shown as in FIG. 2 showing the first implementation state of the first embodiment. In the second to fourth embodiments, the ruptured end 1A of the optical fiber 1 may not yet reach the first pulley 21 and may be positioned on the upstream side of the first pulley 21 at the time when the rotation of the winding bobbin 23 is stopped in some cases, as in FIG. 3 showing the second implementation state of the first embodiment. Even in this case, as already described regarding the first embodiment, it is possible to reliably prevent fiber beating by satisfying each of the above-described conditions.

Next, preferable examples of an adjustment method to satisfy each of the conditions defined in the present invention will be described.

When the screening test method of the present invention is implemented, the optical fiber 1, as an object of the screening test, continuously travels in the tension applying section 15 (refer to FIG. 1). Further, the optical fiber 1 which has passed the tension applying section 15 is continuously wound around the winding bobbin 23 through the first pulley 21 and the second pulley 22. In the tension applying section 15, when the optical fiber 1 is broken, the breakage is detected by a breakage detecting unit. A rotation control unit (not shown) is operated by the detection signal in the winding bobbin 23 and the rotation of the winding bobbin 23 is stopped. The detailed configuration of the breakage detecting unit is not particularly limited and may be the same as a configuration of a screening test apparatus in the related art. For example, a fluctuation in the applied tension may be detected by the dancer roll, a roller-type tensiometer or the like, or may be detected from a fluctuation in the position of the dancer roll, or further, may be detected by using a laser transmission type optical sensor used to detect the presence of the optical fiber in the pass line or the like. In addition, the rotation control unit of the winding bobbin 23 includes a speed reducer, and a mechanical or electrical braking unit.

When the rotation of the winding bobbin 23 is stopped, in the first to fourth embodiments shown in FIGS. 2 to 6, it is necessary to adjust a positional relationship among the first pulley 21, the second pulley 22 and the winding bobbin 23 such that the outer circumferential surface 23A of the winding bobbin 23 on which the optical fiber 1 is already wound is not positioned on the extension line Q1 of the linear optical fiber travelling path from the first pulley 21 to the second pulley 22 (P12 to P21).

In order to adjust the positional relationship at the time when the rotation of the winding bobbin 23 is stopped in this manner, when the positions (rotation center positions) of the first pulley 21 and the second pulley 22 are fixed, the arrangement position of the first pulley 21, the second pulley 22 and the winding bobbin 23 may be adjusted in advance such that the above condition is satisfied from the start of winding to the end (full winding). For example, the arrangement position of the first pulley 21, the second pulley 22 and the winding bobbin 23 may be set in advance such that the wound outer circumferential surface is not positioned on the extension line Q1 in an assumed full winding state of the winding bobbin 23. Alternatively, the arrangement position of the first pulley 21, the second pulley 22 and the winding bobbin 23 may be set in advance such that the entire winding bobbin 23 including the flange section is not positioned on the extension line Q1.

On the other hand, when either of or both the first pulley 21 and the second pulley 22 are a movable type, an adjustment may be performed such that the already-wound outer circumferential surface 23A of the winding bobbin 23 is not positioned on the extension line Q1 by moving the first pulley 21 and/or the second pulley 22 during a winding period, or during the detection of optical fiber breakage at the time when the rotation of the winding bobbin 23 is stopped. The extension line Q1 is determined by the positions of the first pulley 21 and the second pulley 22. Therefore, an adjustment can be performed such that the extension line Q1 is not positioned on the already-wound outer circumferential surface 23A of the winding bobbin 23 by changing the position of the extension line Q1 by moving the first pulley 21 and/or the second pulley 22 at the timing at which the rotation of the winding bobbin 23 is stopped.

Specifically, for example, an adjustment may be performed such that the extension line Q1 is not positioned on the already-wound outer circumferential surface 23A of the winding bobbin 23 at any time by continuously or gradually (intermittently) moving the first pulley 21 and/or the second pulley 22 from the start of winding to the end during the winding period, regardless of the occurrence of breakage.

Alternatively, the first pulley 21 and/or the second pulley 22 start moving according to the detection signal at the time point at which the breakage of the optical fiber 1 is detected. Then, a control may be performed such that the extension line Q1 is not positioned on the already-wound outer circumferential surface 23A of the winding bobbin 23 until the rotation of the winding bobbin 23 is actually stopped. In this case, it is necessary to instantaneously or rapidly move the first pulley 21 and/or the second pulley 22. However, the first pulley 21 and/or the second pulley 22 may continuously move even after the rotation of the winding bobbin 23 is stopped.

Next, specific methods which satisfy the conditions of Expressions (2) and (3) will be described. That is, a specific method for adjusting the length L3 (P22 to P3) of the linear travelling path from the wrapping surface of the second pulley 22 to the outer circumferential surface 23A of the winding bobbin 23 on which the optical fiber is wrapped to be shorter than ½ of the circumferential length L1 of the already-wound outer circumferential surface 23A of the winding bobbin 23, and to be shorter than the length L2 of the linear travelling path from the wrapping surface of the first pulley 21 to the wrapping surface of the second pulley 22 (the linear distance between P12 and P21) at the time when the rotation of the winding bobbin 23 is stopped will be described. The specific method may be performed according to a method of adjusting the arrangement position such that extension line Q1 is not positioned on the already-wound outer circumferential surface 23A of the winding bobbin 23 at the time when the rotation of the winding bobbin 23 is stopped as already described above.

That is, when the positions (rotation center positions) of the first pulley 21 and the second pulley 22 are fixed, the arrangement position of the first pulley 21, the second pulley 22 and the winding bobbin 23 may be adjusted in advance so as to satisfy the conditions of Expressions (2) and (3) from the start of winding to the end (full winding). Here, thickening in winding occurs in the winding bobbin 23 with the progress of winding and the circumferential length L1 f the outer circumferential surface 23A of the winding bobbin 23 is gradually increased. In addition, the length L3 of the linear travelling g path from the wrapping surface of the second pulley 22 to the outer circumferential surface 23A of the winding bobbin 23 on which the optical fiber is wound (P22 to P3) is also changed (there are a case in which L3 is gradually increased by the positional relationship between the second pulley 22 and the winding bobbin 23, and conversely, a case in which L3 is gradually decreased).

Therefore, the arrangement position of the first pulley 21, the second pulley 22, and the winding bobbin 23 from the start of winding to the end of winding (full winding state) of the winding bobbin 23 may be adjusted in advance such that the conditions of Expressions (2) and (3) are satisfied.

On the other hand, when either of or both the first pulley 21 and the second pulley 22 are a movable type, a control may be performed such that the conditions of Expressions (2) and (3) are satisfied by moving the first pulley 21 and/or the second pulley 22 during a winding period, or during the breakage detection of optical fiber at the time when the rotation of the winding bobbin 23 is stopped.

That is, while the value of L2 is determined by the relationship between the first pulley 21 and the second pulley 22, the circumferential length L1 of the already-wound outer circumferential surface 23A of the winding bobbin 23 is changed with the progress of winding. In addition, the length L3 of the linear travelling path from the wrapping surface of the second pulley 22 to the outer circumferential surface 23A of the winding bobbin 23 on which the optical fiber is already wound is also changed with the progress of winding. Therefore, a control can be performed such that the conditions of Expressions (2) and (3) are satisfied by moving the first pulley 21 and/or the second pulley 22 with the progress of winding at the timing at which the rotation of the winding bobbin 23 is stopped.

Specifically, for example, a control may be performed such that the conditions of Expressions (2) and (3) are satisfied at all times by continuously or gradually (intermittently) moving the first pulley 21 and/or the second pulley 22 from the start of winding to the end during the winding period, regardless of the occurrence of breakage.

Alternatively, the first pulley 21 and/or the second pulley 22 start moving according to the detection signal at the time point at which the breakage of the optical fiber 1 is detected. Then, a control may be performed such that the conditions of Expressions (2) and (3) are satisfied until the rotation of the winding bobbin 23 is actually stopped. In this case, it is necessary to instantaneously or rapidly move the first pulley 21 and/or the second pulley 22. However, the first pulley 21 and/or the second pulley 22 may continuously move even after the rotation of the winding bobbin 23 is stopped.

The first pulley 21 and/or the second pulley 22 may be a movable type, and thus, the movement of the first pulley 21 and/or the second pulley 22 may be adjusted such that the conditions of Expressions (2) and (3) are satisfied at the time when the rotation of the winding bobbin 23 is stopped. The movement adjustment is preferably performed also as the above-described "movement adjustment for performing an adjustment such that the already-wound outer circumferential surface 23A of the winding bobbin 23 is not positioned on the above-described extension line Q1 at the time when the rotation of the winding bobbin 23 is stopped". That is, it is preferable that the movement of the first pulley 21 and/or the second pulley 22 be adjusted so as to satisfy the condition of "already-wound outer circumferential surface 23A of the winding bobbin 23 is not positioned on the above-described extension line Q1 at the time when the rotation of the winding bobbin 23 is stopped" and the conditions of Expressions (2) and (3) at the same time.

Further, a specific method which satisfies the condition of Expression (1) will be described. That is, a specific method for adjusting the length L0 of the ruptured end 1A portion of the optical fiber 1 which still remains without being wound around the winding bobbin 23 at the time when the rotation of the winding bobbin 23 is stopped to be longer than the circumferential length L1 of the already-wound outer circumferential surface 23A of the winding bobbin 23 will be described.

The length L0 of the ruptured end portion of the optical fiber 1 which still remains without being wound around the winding bobbin 23 at the time when the rotation of the winding bobbin 23 is stopped means a length obtained by subtracting the length of the optical fiber 1 wound around winding bobbin 23 until the rotation of the winding bobbin 23 is actually stopped from the length of the optical fiber 1 which still remains without being wound around the winding bobbin 23 at the moment in which the breakage of the optical fiber 1 is detected. Here, the length of the optical fiber wound around the winding bobbin 23 by the inertial motion is not included.

The length of the optical fiber 1 from the timing at which the breakage of the optical fiber 1 is detected to the timing at which the rotation of the winding bobbin 23 is stopped can be calculated from a circumferential length of the winding bobbin 23 around which the optical fiber is wound at the timing of the breakage detection, and the number of rotations of the winding bobbin 23 from the timing of the breakage detection to the timing at which the rotation of the winding bobbin 23 is stopped.

The circumferential length of the winding bobbin 23 around which the optical fiber is wound at the timing of the breakage detection may be obtained by an estimation calculation from winding length that can be obtained from a length counter of an apparatus or the like, or may be obtained from a value of an amount of winding by a winding amount sensor.

On the other hand, the number of rotation of the winding bobbin 23 from the timing of the breakage detection to the timing at which the rotation of the winding bobbin 23 is stopped can be calculated from information based on a value of an encoder or a sensor (winding counter) attached to the rotation portion of the winding bobbin 23.

The winding length counter may be provided to the winding bobbin 23 or around the winding bobbin 23 to directly measure the length of the optical fiber 1 from the timing at which the breakage of the optical fiber 1 is detected to the timing at which the rotation of the winding bobbin 23 is stopped without using such methods.

The length of the wound optical fiber 1 from the timing at which the breakage of the optical fiber 1 is detected to the timing at which the rotation of the winding bobbin 23 is stopped can be adjusted by adjusting the time until the rotation of the winding bobbin 23 is stopped (the rotation stop) according to the winding length of the optical fiber 1 wound around the winding bobbin 23 at the timing at which the breakage of the optical fiber 1 is detected. Here, the adjustment when the rotation of the winding bobbin 23 is stopped can be performed by an adjustment of the (mechanical or electrical) braking force of the braking unit of the winding bobbin 23, an adjustment of a deceleration rate of a speed reducer in a winding bobbin rotation drive mechanism, or the combination thereof. For example, when the adjustment is performed by the braking unit of the winding bobbin 23, the length of the wound optical fiber 1 can be obtained by acquiring data from experiments, and when a deceleration rate of a speed reducer is adjusted, the length of the wound optical fiber 1 can be obtained from the a deceleration rate.

The breakage of the optical fiber 1 in the screening test occurs in the tension applying section. When the breakage occurs at a position on the most downstream side of the tension applying section (a fiber outgoing position in the tension applying section), at the time of the occurrence of the breakage, the ruptured end 1A portion of the optical fiber 1 that still remains without being wound around the winding bobbin 23 has the shortest length and has the highest possibility of fiber beating occurring. Due to this fact, the actual adjustment is preferably performed by assuming breakage occurring at the position on the most downstream side of the tension applying section (breakage at the fiber outgoing position in the tension applying section) to reliably exhibit an effect of preventing fiber beating. Accordingly, when the breakage of the optical fiber 1 is detected, it is preferable to control the braking force of the braking unit of the winding bobbin 23, the deceleration rate of the speed reducer, and the like so that a length obtained by subtracting "the length of the optical fiber wound around the winding bobbin 23 until the rotation of the winding bobbin 23 is stopped from the detection of the breakage" from "the length of the pass line (the length of the travelling path) from the fiber outgoing position in the tension applying section to the winding start position P3 of the winding bobbin 23" based on the information on the length of the optical fiber wound around the winding bobbin 23 obtained from, for example, a winding counter becomes a length that is longer than the circumferential length L1 of the already-wound outer circumferential surface 23A calculated from the information of the length of the optical fiber wound around the winding bobbin 23 in the same manner.

In some cases, the braking force to the winding bobbin 23, the deceleration rate or the like may be set to be constant without any change. In this case, a case in which, while the rotation of the winding bobbin 23 is stopped by the breakage occurring from the start of winding to the end of winding, the length of the optical fiber 1 remaining at the time of the rotation stop is shortest is assumed. Then, even in this case, the line speed, the braking force to the winding bobbin 23 or the deceleration rate may be set in advance so as to satisfy the condition of Expression (1). In this case, it is unnecessary to adjust the line speed, the braking force or the deceleration rate in a troublesome manner during the winding period or at the time of breakage detection, and thus, the method of the present invention can be easily implemented.

As described above, when either of or both the first pulley 21 and the second pulley 22 are a movable type, the first pulley 21 and/or the second pulley 22 are moved during the winding period or the time when the breakage of the optical fiber 1 is detected. Then, when the movement is adjusted such that the already-wound outer circumferential surface 23A of the winding bobbin 23 is not positioned on the extension line Q1 at the time when the rotation of the winding bobbin 23 is stopped, and Expressions (1) to (3) are satisfied, fiber beating can be prevented at the time when the rotation of the winding bobbin is stopped and the degree of freedom in the arrangement of each of the pulleys 21 and 22 and the winding bobbin 23 can be increased.

On the other hand, as already described above, when the positions (the rotation center positions) of the first pulley 21 and the second pulley 22 are fixed, the arrangement position of the first pulley 21, the second pulley 22 and the winding bobbin 23 may be adjusted in advance such that the above condition is satisfied from the start of winding to the end (full winding). For example, the arrangement position of the first pulley 21, the second pulley 22 and the winding bobbin 23 may be set in advance such that the wound outer circumferential surface is not positioned on the extension line Q1 in an assumed full winding state of the winding bobbin 23 and Expressions (1) to (3) are satisfied. Since it is not necessary to perform movement control of each of the pulleys 21 and 22 and various detections therefor during the winding period or at the time when the breakage of the optical fiber 1 is detected, a control system and a detection system in the screening test apparatus are simplified and easily implementable. Thus, the overall cost of equipment is reduced.

Here, in both the case in which the positions of the first pulley 21 and the second pulley 22 are fixed and the case in which either of or both the first pulley 21 and the second pulley 22 are a movable type, the length L0 of the ruptured end of the optical fiber which still remains without being wound around the winding bobbin 23 at the time when the rotation of the winding bobbin 23 is stopped will be described. Herein, the rotation of the winding bobbin 23 may be controlled to stop so that a length which is equal to or longer than the circumferential length of the outer circumferential on which the optical fiber is wound remains in an assumed full winding state of the winding bobbin 23. In this case, even when breakage occurs at any timing from the start of winding to the full winding, the condition of Expression (1) is surely satisfied. When such control is performed, the control during the winding period or at the time of the breakage detection is simplified and thus, control management becomes easy. That is, when a winding drum diameter of the winding bobbin 23, a target winding length, and the like are determined, a length to remain at the time of rotation stop can also be determined, and thus, it is unnecessary to perform an operation of adjusting a length to remain during the winding period or at the time of the breakage detection.

In the above-described case, the ruptured end portion of the optical fiber remains excessively at an early stage of the winding to stop the rotation of the winding bobbin 23. However, the length of the excessive portion that remains can be suppressed to be at most a difference between the circumferential length in the full winding state and the circumferential length of the winding drum. Since the substantial difference is small, there is no great loss.

On the other hand, when either of or both the first pulley 21 and the second pulley 22 are a movable type, the length L0 of the terminal portion in the ruptured end 1A of the optical fiber 1 that remains without being wound until the rotation of the winding bobbin 23 is stopped is controlled so as to be extremely close to the circumferential length L1 of the already-wound outer circumferential surface of the winding bobbin 23 at that point by controlling the movement of the pulleys during the winding period or at the time when the breakage of the optical fiber is detected (that is, L0 is controlled so as to be close to the minimum value which satisfies Expression (1)). Then, the length of the pass line can be decreased and a defect caused by extension of the pass line, for example, defects such as an increase in the size of equipment and an increase in the cost of equipment, and difficulty in application to an existing screening test apparatus can be more reliably suppressed.

Figure 7:
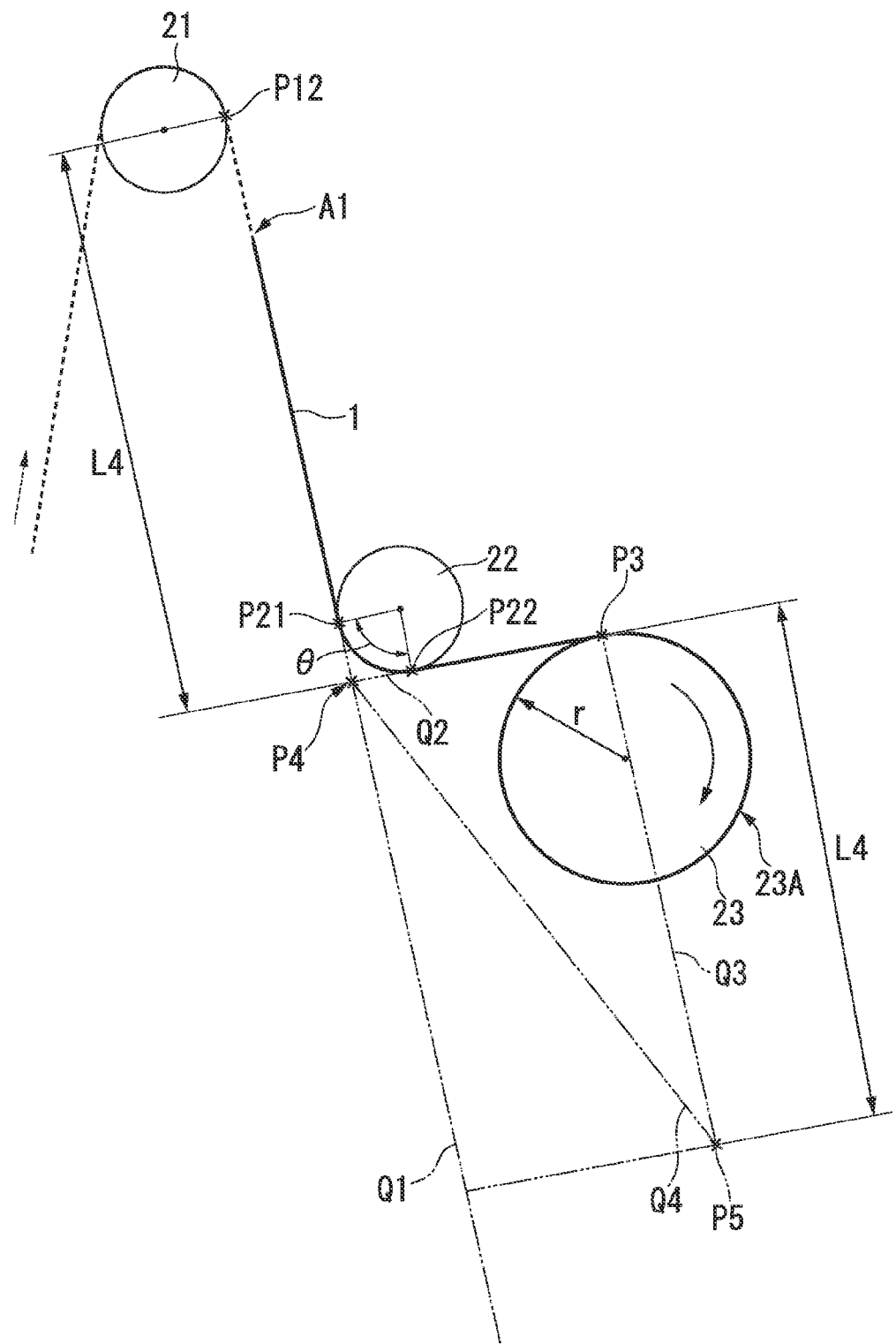
FIG. 7 is a schematic view showing an example of a state in which a fifth embodiment of the screening test method of the present invention is implemented.

In FIG. 7, an example in which a screening test method of a fifth embodiment of the present invention is implemented is shown according to the arrangement relationship of each of the pulleys 21 and 22 and the winding bobbin 23 shown in FIG. 2.

The fifth embodiment is a more preferable embodiment for reliably suppressing the occurrence of fiber beating. On the premise that the above conditions of Expressions (1) to (3) are satisfied, and at the time point when the optical fiber 1 is broken and the rotation of the winding bobbin 23 is stopped, an adjustment is performed such that the already-wound outer circumferential surface 23A of the winding bobbin 23 is not positioned on the extension line Q1 of the linear optical fiber travelling path (P12 to P21) from the first pulley 21 to the second pulley 22. Further, an adjustment is performed such that the already-wound outer circumferential surface 23A of the winding bobbin 23 is not positioned on the line segment Q4 in FIG. 7.

More specifically, the fifth embodiment will be described. In FIG. 7, an intersection point of the extension line Q1 of the linear travelling path (P12 to P21) from the first pulley 21 to the second pulley 22 and the extension line Q2 of the linear travelling path (P22 to P3) from the second pulley 22 to the winding bobbin 23 is set to P4. On the other hand, a line segment which passes the winding start point P3 of the winding bobbin 23 and is parallel to the extension line Q1 is set to Q3, and a position having the same distance from the winding start point P3 on the extension line Q3 as a distance L4 from the winding separating point P12 of the first pulley 21 to the intersection point P4 is set to P5. A line segment connecting the positions of the intersection points P4 and P5 is set to Q4, and an adjustment is performed such that the already-wound outer circumferential surface 23A of the winding bobbin 23 is not positioned on the line segment Q4.

The fifth embodiment is particularly effective when the wrapping angle θ of the optical fiber run along the second pulley 22 (a contact angle of the optical fiber to the second pulley 22) is small, or when the linear density of the optical fiber is high. That is, when the wrapping angle θ of the optical fiber wound around the second pulley 22 is small, and when the linear density of the optical fiber is high, the inertial force in a direction from the second pulley 22 to the winding bobbin 23 cannot be ignored completely. A possibility of the occurrence of fiber beating caused by the inertial force cannot be eliminated. That is, in these cases, the ruptured end portion of the optical fiber 1 flies to a portion closer to the winding bobbin 23 than the extension line Q1 at the time when the rotation of the winding bobbin 23 is stopped. Therefore, while the arrangement position is adjusted such that the already-wound outer circumferential surface 23A of the winding bobbin 23 is not positioned on the extension line Q1, there is a possibility of fiber beating occurring.

When an adjustment is performed such that the already-wound outer circumferential surface 23A of the winding bobbin 23 is not positioned on the line segment Q4, in a case in which the contact angle θ of the optical fiber 1 to the second pulley 22 is small and a case in which the linear density of the optical fiber 1 is high, it is possible to effectively prevent fiber beating caused by the inertial force from the second pulley 22 to the winding bobbin 23 from occurring.

In the usual case other than these cases, fiber beating can be more reliably and stably prevented by performing an adjustment such that the already-wound outer circumferential surface 23A of the winding bobbin 23 is not positioned on the line segment Q4.

In FIG. 7, as in FIG. 2, a state in which the ruptured end 1A of the optical fiber 1 has already passed over the first pulley 21 and is positioned between the first pulley 21 and the second pulley 22 in the optical fiber travelling path at the time when the optical fiber 1 is broken and the rotation of the winding bobbin 23 is stopped is shown. However, in some cases, as in the FIG. 3, when the ruptured end 1A of the optical fiber 1 does not yet reach the first pulley 21 and is positioned on the upstream side of the first pulley 21 at the time when the rotation of the winding bobbin 23 is stopped, the fifth embodiment can be applied.

Further, FIG. 7 shows the positional relationship among the first pulley 21, the second pulley 22 and the winding bobbin 23 which is the same as the positional relationship in the first embodiment shown in FIGS. 2 and 3. However, the fifth embodiment can be applied to the positional relationship which is the same as the positional relationship in each of the second to fourth embodiments shown in FIGS. 4 to 6.

In addition, as the method of specifically implementing the fifth embodiment shown in FIG. 7, a method substantially the same as in the first to fourth embodiments shown in FIGS. 2 to 5 can be applied. However, in the first to fourth embodiments shown in FIGS. 2 to 5, an adjustment may be performed such that the extension line Q1 is not positioned on the already-wound outer circumferential surface 23A of the winding bobbin 23. Contrarily, in the fifth embodiment shown in FIG. 7, an adjustment is performed such that the line segment Q4 which is closer to the rotation center of the winding bobbin 23 than the extension line Q1 is not positioned on the already-wound outer circumferential surface 23A of the winding bobbin 23. Accordingly, the extension line Q1 may be replaced with the line segment Q4 in the specific adjustment method in the first to fourth embodiments shown in FIGS. 2 to 5. The line segment Q4 can be obtained from the calculation using the distance between P12 and P21, the diameter of the second pulley 22, the contact angle θ to the second pulley 22 determined by the positional relationship between the second pulley 22 and the winding bobbin 23, and the diameter of the already-wound outer circumferential surface of the winding bobbin 23.

Figure 8:
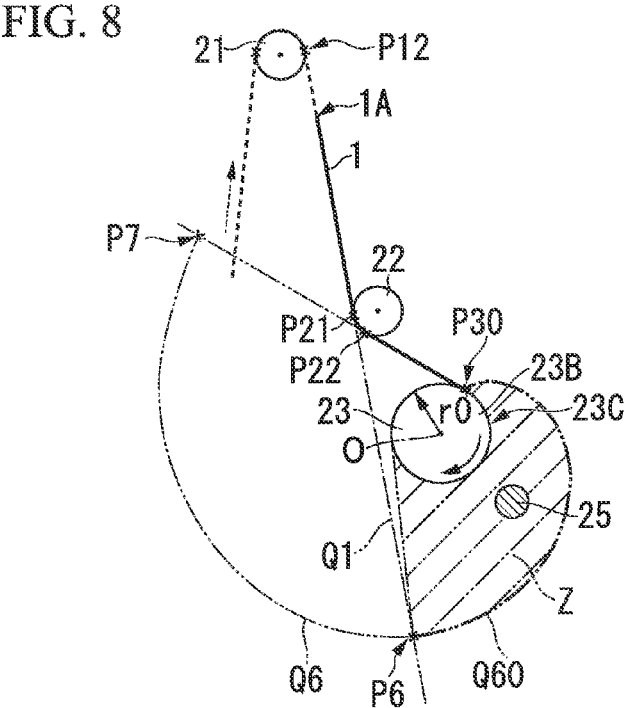
FIG. 8 is a schematic view showing an example of a state in which a sixth embodiment of the screening test method of the present invention is implemented.

Further, in FIG. 8, an example in which a sixth embodiment of the present invention is implemented is shown.

In the sixth embodiment, an involute curve Q6 having an outer circumferential circle of a winding drum 23B of the winding bobbin 23 as a base circle is assumed and a buffering member 25 is arranged in an inner region divided by a line segment Q60 on the involute curve Q6. When the terminal portion of the ruptured end 1A of the optical fiber 1 is wrapped on the outer circumference of the winding bobbin 23 by the inertial force at the time when the rotation of the winding bobbin 23 is stopped with the breakage of the optical fiber 1, the buffering member 25 functions as a barrier which prevents direct collision of the wrapped terminal portion with the already-wound outer circumferential surface 23A of the winding bobbin 23 and also has a function of attenuating motion energy in the wrapped terminal portion. In the sixth embodiment shown in FIG. 8, the arrangement of the first pulley 21, the second pulley 22 and the winding bobbin 23 is the same as the arrangement shown in FIG. 2 or FIG. 3.

Here, the involute curve Q6 in FIG. 8 will be described.

The involute curve Q6 is assumed in which the rotation center of the winding bobbin 23 is set to a center point O, the outer circumference of the winding drum 23B in the winding bobbin 23 (a circle of a radius r0) is set to a base circle, and the winding starting point of the optical fiber 1 in the winding drum 23B is set to a starting point P30 of an involute development locus. A development direction of the involute curve Q6 having P30 as the starting point varies depending on the arrangement relationship between the second pulley 22 and the winding bobbin 23. However, in the sixth embodiment shown in FIG. 8, the linear optical fiber travelling path from the second pulley 22 to the winding bobbin 23 is an internal common tangent of a circle formed by the outer circumferential surface of the second pulley 22 and a circle formed by the already-wound outer circumferential surface of the winding bobbin 23. In this case, the development direction of the involute curve Q6 is set to the same direction as the winding direction of the winding bobbin 23 (the rotation direction during winding).

In the arrangement configuration of the second embodiment shown in FIG. 4, the buffering member 25 can be arranged by assuming the involute curve Q6. In this case, the linear optical fiber travelling path from the second pulley 22 to the winding bobbin 23 is an internal common tangent of a circle formed by the outer circumferential surface of the second pulley 22 and a circle formed by the already-wound outer circumferential surface of the winding bobbin 23. Therefore, the development direction of the involute curve Q6 having P30 as the starting point is set to the same direction as the winding direction of the winding bobbin as in FIG. 8.

Further, on the involute curve Q6, a position P6 at which the involute curve Q6 initially intersects with the extension line Q1 of the linear optical fiber travelling path from the first pulley 21 to the second pulley 22, and a position P7 in which an involute development angle is 360° are assumed. On the involute curve Q6, a line segment from the starting point P30 to one of the two positions P6 and P7 which is closer to the starting point P30 is set to Q60. Here, in the sixth embodiment shown in FIG. 8, the position P6 which is an initial intersection position with the extension line Q1 is closer to the starting point P30 between the position P6 which is an initial intersection position with the extension line Q1 and the position P7 having a development angle of 360°. Therefore, a line segment from the starting point P30 to the position P6 which is an initial intersection position with the extension line Q1 on the involute curve Q6 is set to the above-described line segment Q60. Then, the buffering member 25 is arranged in a region Z between the line segment Q60 on the involute curve Q6 and an outer circumferential surface 23C of the winding drum 23B of the winding bobbin 23. In FIG. 8, the line segment Q60 on the above-described involute curve Q6 is expressed by a thick chain line and the region Z is expressed by a hatched chain line.

When the buffering member 25 is arranged in the region Z, even when the terminal portion of the ruptured end 1A of the optical fiber 1 is wrapped around the outer circumference of the winding bobbin 23 by the inertial force at the time when the rotation of the winding bobbin 23 is stopped with the breakage of the optical fiber 1, the wrapped terminal portion comes into contact with the buffering member 25 first. Thus, direct collision with the already-wound outer circumferential surface 23A of the winding bobbin 23 is avoided. That is, when the terminal portion of the ruptured end of the optical fiber 1 is wrapped around the outer circumferential surface of the winding bobbin 23 by the inertial force at the time when the rotation of the winding bobbin 23 is stopped with the breakage of the optical fiber 1, the wrapped terminal portion is wrapped from the outside of the above-described involute curve Q6 to the inside thereof. Therefore, when the buffering member 25 is arranged in the region Z inside the involute curve Q6, the terminal portion usually comes into contact with the buffering member 25 from the outside. As a result, it is possible to prevent direct fiber beating to the already-wound outer circumferential surface 23A of the winding bobbin 23 by the inertial force. In addition, at the same time, when the length of the terminal portion of the optical fiber remaining at the time when the rotation of the winding bobbin 23 is stopped is long, a tip end portion may collide with the already-wound outer circumferential surface 23A instead of the buffering member 25 in the wrapping. In this case, since the motion energy is attenuated by the buffering member 25, there is a low concern that the optical fiber 1 on the already-wound outer circumferential surface 23A may be damaged. Further, when co-rotation of the terminal portion of the ruptured end in the optical fiber 1 occurs at the time when the rotation of the winding bobbin is stopped, the terminal portion is repelled and moves violently by the buffering member 25, and thus, there is a possibility that the terminal portion may beat the optical fiber 1 of the already-wound outer circumferential surface 23A. However, originally, in the present invention, a phenomenon of co-rotation does not easily occur as described above, and if the co-rotation occurs, the motion energy of the co-rotating terminal portion is decreased due to an effect of attenuating motion energy by the buffering member 25. Therefore, a problem of fiber beating caused by the co-rotation is avoided.

The length L0 of the ruptured end 1A portion of the optical fiber 1 to remain at the time when the rotation of the winding bobbin 23 is stopped is adjusted to be longer than the circumferential length L1 of the wound outer circumferential surface of the winding bobbin 23 as defined in Expression (1). On the other hand, the region Z in which the buffering member 25 is arranged is a region provided inside of the line segment Q60 from the starting point P30 on the involute curve Q6 to one of the position P6 at which the involute curve Q6 initially intersects with the extension line Q1 of the linear optical fiber travelling path from the first pulley to the second pulley, and the position P7 in which an involute development angle is 360°, which is closer to the starting point P30 (P6 in the example of FIG. 8), (that is, a region provided between the line segment Q60 and the outer circumferential surface 23C of the winding drum 23B of the winding bobbin 23). In this case, when the terminal portion of the ruptured end in the optical fiber 1 is wrapped during the period from the early stage of winding start to full winding, the terminal portion comes almost reliably into contact with the buffering member 25 and the above-described effect can be exhibited.

The buffering member 25 may basically function as a barrier which prevents the terminal portion of the ruptured end of the optical fiber 1 from directly beating the optical fiber on the already-wound outer circumferential surface of the winding bobbin 23 by the wrapping of the terminal portion of the ruptured end of the optical fiber 1 at the time when the rotation of the winding bobbin is stopped. Accordingly, the material of the buffering member 25 is not particularly limited and may be a rigid body such as metal. However, when the terminal portion of the optical fiber comes into contact with the buffering member 25, it is preferable for the buffering member to absorb and attenuate the motion energy of the terminal portion of the optical fiber and to have cushioning (elasticity) to a degree to which the optical fiber 1 is not damaged. From this viewpoint, for example, the buffering member may be made of rubber, synthetic resin and the like. In addition, the shape of the buffering member 25 is not particularly limited and may be, for example, an axial shape parallel with the rotation center axis of the winding bobbin 23 or a rod shape, or may be a plate shape in an outer circumferential direction of the winding bobbin 23 or in a tangent direction thereof, and the like.

When the terminal portion of the ruptured end of the optical fiber 1 is wrapped, it is preferable that the buffering member 25 have a width (a width in a direction parallel with the rotation center axis of the winding bobbin 23) of equal to or larger than the width of the winding bobbin 23 so that the terminal portion reliably comes into contact with the buffering member.

Here, when the winding bobbin 23 is a traverse type for winding the optical fiber 1 while the winding bobbin reciprocates in a direction parallel with the rotation center axis thereof, it is preferable that the width of the buffering member 25 be controlled to be equal to or more than the width of the winding bobbin 23, and the buffering member 25 be configured to traverse along with the winding bobbin 23. In addition, similarly, when the winding bobbin 23 is a traverse type, the width of the buffering member 25 may be controlled to cover a traverse range of the winding bobbin 23. Further, when the winding bobbin 23 is not a traverse type and the second pulley 22 is a traverse type, the width of the buffering member 25 may be controlled to be equal to or more than the width of the winding bobbin 23.

At the time when the rotation of the winding bobbin 23 is stopped by the breakage of the optical fiber 1, even when the ruptured end 1A of the optical fiber 1 is positioned on the upstream side of the first pulley 21 as shown in FIG. 3, the same effect can be obtained by assuming the involute curve in the same manner as described above, and providing the buffering member 25.

In addition, as in the third embodiment shown in FIG. 5, or the fourth embodiment shown in FIG. 6, when the linear optical fiber travelling path from the second pulley 22 to the winding bobbin 23 is the external common tangent of the circle formed by the outer circumferential surface of the second pulley 22 and the circle formed by the already-wound outer circumferential surface of the winding bobbin 23, there is a possibility of the optical fiber being wrapped in a direction in which the optical fiber which has been already wound around the winding bobbin 23 is unwound at the time when the rotation of the winding bobbin 23 is stopped. In this manner, when the optical fiber is wrapped in the direction in which the optical fiber which has been already wound around the winding bobbin 23 is unwound, fiber beating to the already-wound outer circumferential surface of the winding bobbin 23 does not easily occur.

However, even when there is a possibility of the optical fiber being wrapped in a direction in which the optical fiber which has been already wound around the winding bobbin 23 is unwound as described above, it is considered that the optical fiber is not actually unwound smoothly and is wrapped in the winding direction with the vicinity of the winding starting point P30 as a starting point by a jumble of the optical fiber or the like on the outer circumferential side of the winding bobbin. Here, even when the linear optical fiber travelling path from the second pulley 22 to the winding bobbin 23 is the external common tangent of the circle formed by the outer circumferential surface of the second pulley 22 and the circle formed by the already-wound outer circumferential surface of the winding bobbin 23, for example, as shown in the seventh embodiment in FIG. 9, the involute curve Q6 having the outer circumferential circle of the winding drum 23B of the winding bobbin 23 as the base circle is assumed and the buffering member 25 is arranged in an inner region Z divided by the involute curve Q6.

The involute curve Q6 in the seventh embodiment shown in FIG. 9 will be described.

The involute curve Q6 is assumed in the same manner as in the sixth embodiment shown in FIG. 8 in which the rotation center of the winding bobbin 23 is set to the center point O, the outer circumference of the winding drum 23B in the winding bobbin 23 (the circle of a radius r0) is set to the base circle, and the winding starting point of the optical fiber 1 in the winding drum 23B is set to the starting point P30 of the involute development locus. However, in the seventh embodiment shown in FIG. 9, the development direction of the involute curve Q6 having P30 as the starting point is different from the development direction in the sixth embodiment shown in FIG. 8. That is, in the seventh embodiment shown in FIG. 9, the linear optical fiber travelling path from the second pulley 22 to the winding bobbin 23 is the external common tangent of the circle formed by the outer circumferential surface of the second pulley 22 and the circle formed by the already-wound outer circumferential surface of the winding bobbin 23. In this case, the development direction of the involute curve Q6 is set to a direction opposite to the winding direction of the winding bobbin 23 (the rotation direction in the winding).

Figure 9:
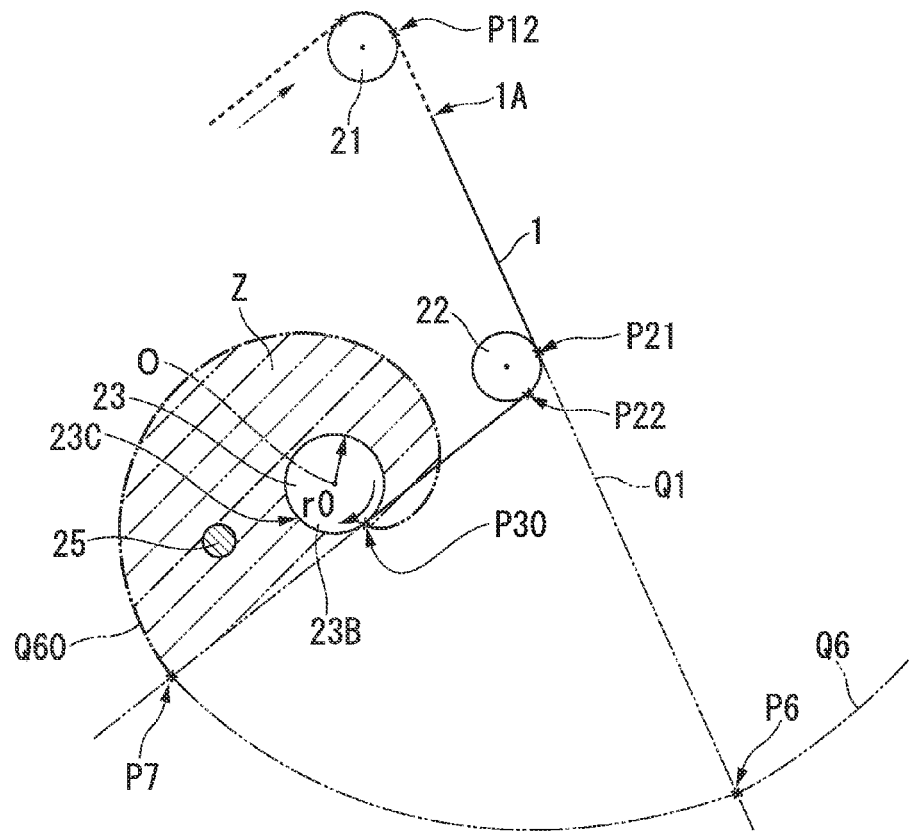
FIG. 9 is a schematic view showing an example of a state in which a seventh embodiment of the screening test method of the present invention is implemented.

In the seventh embodiment shown in FIG. 9, the position P7 in which an involute development angle is 360° is closer to the starting point P30 between the position P6 at which the involute curve Q6 initially intersects with the extension line Q1 of the linear optical fiber travelling path from the first pulley 21 to the second pulley 22, and the position P7 in which an involute development angle is 360°. Therefore, the line segment Q60 on the involute curve Q6 which defines the region Z in which the buffering member is arranged is a line segment from the starting point P30 to the position P7 having an involute development angle of 360°. The buffering member 25 is arranged in the region Z between the line segment Q60 from the starting point P30 to P7 on the involute curve Q6 and the outer circumferential surface 23C of the winding drum 23B of the winding bobbin 23.

In the fourth embodiment shown in FIG. 6, the buffering member 25 can be arranged by assuming the involute curve Q6. Even in this case, the linear optical fiber travelling path from the second pulley 22 to the winding bobbin 23 is the external common tangent of the circle formed by the outer circumferential surface of the second pulley 22 and the circle formed by the already-wound outer circumferential surface of the winding bobbin 23. Therefore, the development direction of the involute curve Q6 having P30 as the starting point is a direction opposite to the winding direction of the winding bobbin as in FIG. 9.

Since the buffering member 25 may have a shape and a size in which the wrapped terminal portion of the optical fiber can come into contact with the buffering member, the buffering member does not necessarily have a large shape, and the arrangement position may be within a range of the region Z. Therefore, unlike the fiber beating preventing cover disclosed in Japanese Unexamined Patent Application, First Publication No. 2004-59243, a degree of freedom in selection of a shape and a size, and a degree of freedom in arrangement position selection are high. Accordingly, the buffering member can easily be added to an existing screening apparatus without being an obstacle to peripheral members or devices or causing an increase in the size of the screening test apparatus. A member arranged around the winding bobbin in the exiting screening test apparatus can also be used as the buffering member 25.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An optical fiber screening test method in which while continuously travelling, an optical fiber passes a tension applying section which applies tension and the optical fiber which has passed the tension applying section is continuously wound by a winding bobbin, the method comprising:
running the optical fiber to which the tension has been applied along a first pulley and a second pulley sequentially, winding the optical fiber by the winding bobbin, and stopping rotation of the winding bobbin when the optical fiber is broken by applying the tension;
performing an adjustment so that an already-wound outer circumferential surface of the winding bobbin on which the optical fiber is already wound is not positioned on an extension line of a linear optical fiber travelling path from the first pulley to the second pulley at a time when the rotation of the winding bobbin is stopped;
setting lengths L0, L1, L2, and L3 to
L0: a length of the optical fiber remaining from a broken portion of the optical fiber to the winding bobbin in the optical fiber travelling path at the time when the rotation of the winding bobbin is stopped,
L1: a circumferential length of the already-wound outer circumferential surface of the winding bobbin at the time when the rotation of the winding bobbin is stopped,
L2: a length of the linear optical fiber travelling path from a wrapping surface of the first pulley to a wrapping surface of the second pulley, and
L3: a length of the linear optical fiber travelling path from the wrapping surface of the second pulley to the already-wound outer circumferential surface of the winding bobbin at the time when the rotation of the winding bobbin is stopped; and
performing an adjustment so that the lengths L0, L1, L2, and L3 satisfy the following Expressions (1) to (3) at the time when the rotation of the winding bobbin is stopped, $$L0 > L1 \tag{1}$$

$$L3 < L1 \times \tfrac{1}{2} \tag{2}$$

$$L3 < L2 \tag{3}.$$

2. The optical fiber screening test method according to claim 1,
wherein at least one of the first pulley and the second pulley is moved during a winding period by the winding bobbin or at the time when breakage of the optical fiber is detected in the tension applying section.

* * * * *